United States Patent
Miki et al.

(10) Patent No.: US 7,047,256 B2
(45) Date of Patent: May 16, 2006

(54) STORAGE DEVICE SYSTEM HAVING BI-DIRECTIONAL COPY CONTROL FUNCTION

(75) Inventors: Kenichi Miki, Odawara (JP); Kyosuke Achiwa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 157 days.

(21) Appl. No.: 10/750,859

(22) Filed: Jan. 5, 2004

(65) Prior Publication Data

US 2004/0226021 A1    Nov. 11, 2004

(30) Foreign Application Priority Data

May 6, 2003    (JP) ............................. 2003-128163

(51) Int. Cl.
*G06F 12/00* (2006.01)
*G06F 17/30* (2006.01)

(52) U.S. Cl. .................. 707/200; 707/201; 707/204

(58) Field of Classification Search ................. 707/10, 707/101, 202, 204, 200, 201; 711/141, 114
See application file for complete search history.

(56) References Cited

U.S. PATENT DOCUMENTS

| | | | |
|---|---|---|---|
| 5,504,861 A | 4/1996 | Crockett et al. | |
| 6,052,758 A | 4/2000 | Crockett et al. | |
| 6,148,383 A | 11/2000 | Micka et al. | |
| 6,173,377 B1* | 1/2001 | Yanai et al. | ................ 711/162 |
| 6,463,501 B1 | 10/2002 | Kern et al. | |
| 6,487,645 B1 | 11/2002 | Clark et al. | |
| 6,647,474 B1* | 11/2003 | Yanai et al. | ................ 711/162 |
| 6,701,455 B1 | 3/2004 | Yamamoto et al. | |
| 6,816,951 B1 | 11/2004 | Kimura et al. | |
| 6,871,271 B1 | 3/2005 | Ohran et al. | |
| 2002/0133507 A1* | 9/2002 | Holenstein et al. | .......... 707/200 |
| 2003/0014598 A1* | 1/2003 | Brown | ....................... 711/141 |
| 2004/0073831 A1* | 4/2004 | Yanai et al. | ................... 714/7 |
| 2004/0133591 A1* | 7/2004 | Holenstein et al. | .......... 707/102 |
| 2006/0005074 A1* | 1/2006 | Yanai et al. | ................... 714/5 |

OTHER PUBLICATIONS

Ji et al., "Seneca: remote mirroring done write", Proceedings of USENIX Technical Conference, pp. 253-268, Jun. 2003.*

(Continued)

*Primary Examiner*—Jeffrey Gaffin
*Assistant Examiner*—Michael J. Hicks
(74) *Attorney, Agent, or Firm*—Mattingly, Stanger, Malur & Brundidge, P.C.

(57) ABSTRACT

The copy of data in two directions is realized without fixing a copy direction to one direction between storage device systems which constitute a copy pair. In storage device systems which constitute a copy pair, a data consistency holding control part is disposed. The data consistency holding control part operates so as to write write-in data to a logical volume which forms the copy pair into a physical storage device after cache part has waited for more than a predetermined time from the corresponding reception time, in such a manner that, when write-in data which was received from a superior device and write-in data which was received from another storage device system through DKCI/F are written into the same storage location of the physical storage device in an overlapped manner, they are written in the order of the time of reception on which the write-in data was received from a superior device.

6 Claims, 21 Drawing Sheets

OTHER PUBLICATIONS

Azagury et al., "Advanced functions for storage subsystems: Supporting continuous availability", IBM Systems Journal, vol. 42, No. 2; Internet Publication Date May 1, 2003.*

IBM, "Storage Management for IBM BS UDB: Snapshot Backup and Recovery With the IBM TotalStorage Enterprise Storage Server", 2002.*

Compaq, "Quickspecs SANworks Data Replication Manager", World Wide, Version 15; Oct. 15, 2001.*

6.15 SCSI-2 Detail Commentary, vol. 3, published by CQ publishing Co., Ltd., Feb. 1, 1997.

* cited by examiner

FIG.5

100 DATA CONSISTENCY HOLDING TABLE

| TABLE CONTROL NUMBER 101 | RECEPTION TIME 102 | SUPERIOR DEVICE IDENTIFICATION NUMBER 103 | OBJECT BLOCK START ADDRESS 104 | OBJECT SIZE 105 | STORAGE SERIAL NUMBER 106 | CACHE DATA STORAGE ADDRESS 107 |
|---|---|---|---|---|---|---|
| 1 | 00:00:00 | ---- | ---- | ---- | ---- | ---- |
| 2 | 00:01:30 | ---- | ---- | ---- | ---- | ---- |
| 3 | 00:01:40 | ---- | ---- | ---- | ---- | ---- |
| ... | ......... | | | | | |
| 100 | 00:03:10 | ---- | ---- | ---- | ---- | ---- |
| -1 | | | | | | |

FIG.6

2030 BIT MAP TABLE

200 TEMPORARY BIT MAP TABLE

FIG.13

300 BIT MAP VALUE TABLE

| BIT VALUE | EXPLANATION |
|---|---|
| 0 | DISK IS NOT RESERVED<br>DISK IS IN THE MOST RECENT STATE |
| 1 | DISK IS NOT RESERVED<br>DATA WHICH IS NOT UPDATED IN DISK EXISTS ON CACHE |
| 2 | DISK IS RESERVED IN A CERTAIN SUPERIOR DEVICE,<br>DISK IS IN THE MOST RECENT STATE |
| 3 | DISK IS RESERVED IN A CERTAIN SUPERIOR DEVICE,<br>DATA WHICH IS NOT UPDATED IN DISK EXISTS ON CACHE |

FIG.14

400 LOCK STATE HOLDING TABLE

| CONTROL NUMBER 401 | LOCK START TIME 402 | SUPERIOR DEVICE IDENTIFICATION NUMBER 403 | LOCK OBJECT START ADDRESS 404 | LOCK OBJECT SIZE 405 |
|---|---|---|---|---|
|  |  |  |  |  |
|  |  |  |  |  |
|  |  |  |  |  |
|  |  |  |  |  |
|  |  |  |  |  |

STORAGE DEVICE SYSTEM HAVING BI-DIRECTIONAL COPY CONTROL FUNCTION

BACKGROUND OF THE INVENTION

The present invention relates in general to a storage device system, and, more particularly, the invention relates to a technique for carrying out copying from one storage device system to another storage device system in a bi-directional manner.

In an information system having a host computer operating as a superior device and a plurality of storage device systems (storage systems), a remote copy function is used as a technique for carrying out data copying between storage device systems. The remote copy function involves the copying of data between a plurality of storage device systems which exist at physically remote locations, without intervention of a superior device, in an information processing system, i.e., a technique for carrying out double writing. The storage device system in this case in a system which is configured by a plurality of storage devices and a controller for controlling those storage devices. In an information processing system for carrying out the remote copy function, storage device systems which are disposed respectively at physically remote locations are mutually connected by a dedicated line or a public line. The dedicated line or the public line which is used for this connection is called a remote copy line.

Among the logical storage regions (hereinafter referred to as a "logical volume") provided in a certain storage device system, a logical volume of the same capacity as the capacity of a logical volume which becomes an object of a remote copy (hereinafter referred to as a "copy-source logical volume") is secured in another storage device system for copying the same. This secured logical volume (hereinafter referred to as a "copy-destination logical volume") is formed so as to have a one-to-one relationship with the copy-source logical volume (hereinafter referred to as a "copy pair"). Data of the copy-source logical volume is copied to the copy-destination logical volume through a dedicated line or a public line. In the case of an updating of data which is included in the copy-source logical volume, updated data is transferred through the dedicated line etc. to a storage device system having the copy-source logical volume, and the updated data is also written into the copy-destination logical volume which corresponds to the copy-source logical volume. Using this remote copy technique, in an information processing system having a plurality of storage device systems, it is possible to hold logical volumes to hold the same data contents in a plurality of storage device systems.

By forming a copy pair consisting of a copy source and a copy destination, the copy direction from the copy source to the copy destination is determined to be in one direction. As to the copy-source logical volume, it is possible to carry out a write-in process from a superior device. Adversely, as to the copy-destination logical volume, it is impossible to carry out a write-in process to a superior device.

Supposing that the copy direction is not fixed to one direction and data write-in to a storage device system which configures the copy pair is enabled, it is impossible to hold identical contents of data in respective storage device systems. This is because of the transfer time which is required for transfer of copy data when a superior device carries out write-in to a storage device, and, thereafter, a data content to be written is written into a storage device as the copy destination.

An environment in which a copy pair is formed between a storage device system A and a storage device system B will be described more specifically as an example. Here, the storage device system A and the storage device system B are sufficiently spaced from each other geographically, that it takes, for example, 1 second and more until data is written into the storage device system A from a superior device, and, then, double data is transferred and written into the storage device system B from the storage device system A.

Here, supposing that, at almost the same time, different data contents (content A, content B, respectively) were written into the same regions of the storage device system A and the storage device system B from a superior device, the content A and the content B are written into the storage device system A and the storage device system B, respectively. After the respective data write-ins have been completed, at almost the same time, from the storage device system A to the storage device system B, as well as from the storage device system B to the storage device system A, the content A and the content B are transferred. In such a situation, after the storage device system A and the storage device system B have received the transferred data, the content A and the content B should have been overwritten in the storage device system A and the storage device system B, respectively. In the storage device system A, a situation occurs in which the content B is overwritten on the content A, and in the storage device system B, a situation occurs in which the content A is overwritten on the content B. In such a case, the data contents which were written into the storage device system A and the storage device system B become different, which results in the fact that duplication of the volume has not been carried out.

In order to avoid such a situation and to realize complete duplication of the volume, a copy direction is set to be one direction like from the copy source to the copy destination. The technology regarding this type of remote copy function is disclosed in U.S. Pat. No. 5,742,792 (Patent Document 1).

Up to now, a storage device which is shared by a plurality of superior devices, on the basis of a shared exclusive control request from an arbitrary superior device, realizes a shared exclusive control to an access request from an individual superior device. For example, in an information system which adopts a SCSI (Small Computer System Interface) as an interface between a superior device and a storage device, by use of a reserve series command which is defined by the SCSI, it is possible to realize the shared exclusive control with a logical volume unit of the storage device. On the occasion that a certain superior device has reserved the logical volume, a situation occurs in which read-access and write-access become possible only from the reserved superior device.

In the SCSI reserve series command, there is also an extension command by which the shared exclusive control can be carried out with a block unit of a disk. A SCSI command for reserving a partial region (extent) on this logical volume is defined as an extent reserve (hereinafter referred to as a "region reserve"). A region to be reserved has a reserve attribute. The reserve attribute enables read-share, exclusive-write, exclusive-read, and exclusive access operations. The technology regarding SCSI-2 is described in an item 6.15 of SCSI-2 DETAIL COMMENTARY, Volg. 3, published by CQ Publishing Co., Ltd. on Feb. 1, 1997 (Non-Patent Document 1).

Under the current remote copy technology environment, a shared exclusive control mechanism performed by the reserve series command of a SCSI has not been considered, and even on the occasion in which the logical volume in a certain storage device system is locked by the reserve command, the locked state is not transmitted to a remote copy corresponding logical volume in another storage device system.

This creates a problem in that the remote copy function of the above-described related art enables writing only into the copy-source logical volume from a superior device. Also, there is a problem in that the locked state produced by the reserve series command is not transmitted to the remote copy corresponding logical volume.

SUMMARY OF THE INVENTION

A first object of this invention is to effect control so as to realize a bi-directional copying, without fixing the copy direction to one direction between storage device systems which constitute a copy pair.

A second object of this invention is, in the course of bi-directional copying, to propagate a situation reserved by the reserve series command between storage device systems in which the remote copy function is carried out.

This invention, in order to enable bi-directional copying between storage device systems, provides a data consistency holding control device in the storage device systems which constitute the copy pair. This data consistency holding control device performs control so as to write write-in data which was received from the superior device and write-in data which was received from the other storage device system through the communication interface device into the physical storage device after such write-in data has been made to wait in a temporary storage device for more than predetermined time from the time of reception corresponding to the write-in of data to the logical volume which forms the copy pair, so that, when write-in data which was received from the superior device and write-in data which was received from the other storage device system through the communication interface device are written in an overlapped manner into the same storage location of the physical storage device, they are written in the order of the reception time when the write-in data was received from the superior device.

Also, the storage device system of this invention further has a device for receiving a request for locking a partial region of the logical volume from the superior device and for locking the partial region, a device for transmitting the locking request which was received through the communication interface device to the other storage device system, a device for receiving the locking request through the communication interface device from the other storage device system and for locking a designated partial region, and a device for rejecting a request of write-in data from the superior device and the other storage device system to the partial region, except for a case in which it is a request from the superior device in which the partial region was locked.

BRIEF DESCRIPTION OF THE DRAWINGS

The invention, together with further advantages thereof, may best be understood by reference to the following description taken in conjunction with the accompanying drawings in which:

FIG. 5 is a data consistency holding table for use in the first embodiment;

FIG. 6 shows an example of a temporary bit map table for use in the first embodiment;

FIG. 13 is a table of bit map values of the third embodiment;

FIG. 14 shows an example. of a locked state holding table of the third embodiment;

DESCRIPTION OF THE PREFERRED EMBODIMENTS

(1) FIRST EMBODIMENT

Hereinafter, a first embodiment which relates to bi-directional copying will be described with reference to the drawings.

Figure 1:
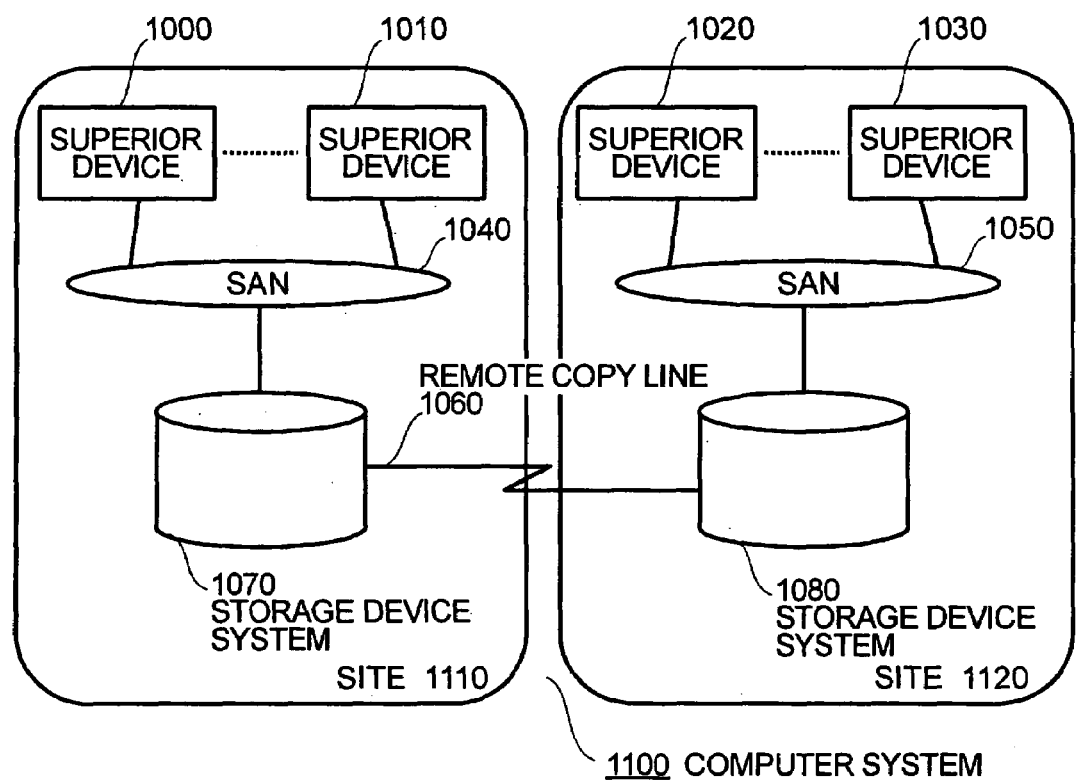
FIG. 1 is a block diagram of a computer system showing a mode for carrying out the invention.

FIG. 1 is a block diagram of a computer system 1100 which employs the features for carrying out the invention. The computer system 1100 is configured by a site 1110 which comprises a plurality of superior devices 1000 and 1010 which are connected through a SAN (Storage Area Network) 1040 to a storage device system 1070, and a site 1120 which comprises a plurality of superior devices 1020 and 1030 which are connected through a SAN 1050 to a storage device system 1080. The storage device system 1070 and the storage device system 1080 are connected by a remote copy line 1060, which may be a dedicated line or a public line. The storage device system 1070 and the storage device system 1080 can communicate with each other through the remote copy line 1060, using SCSI protocol.

Figure 2:
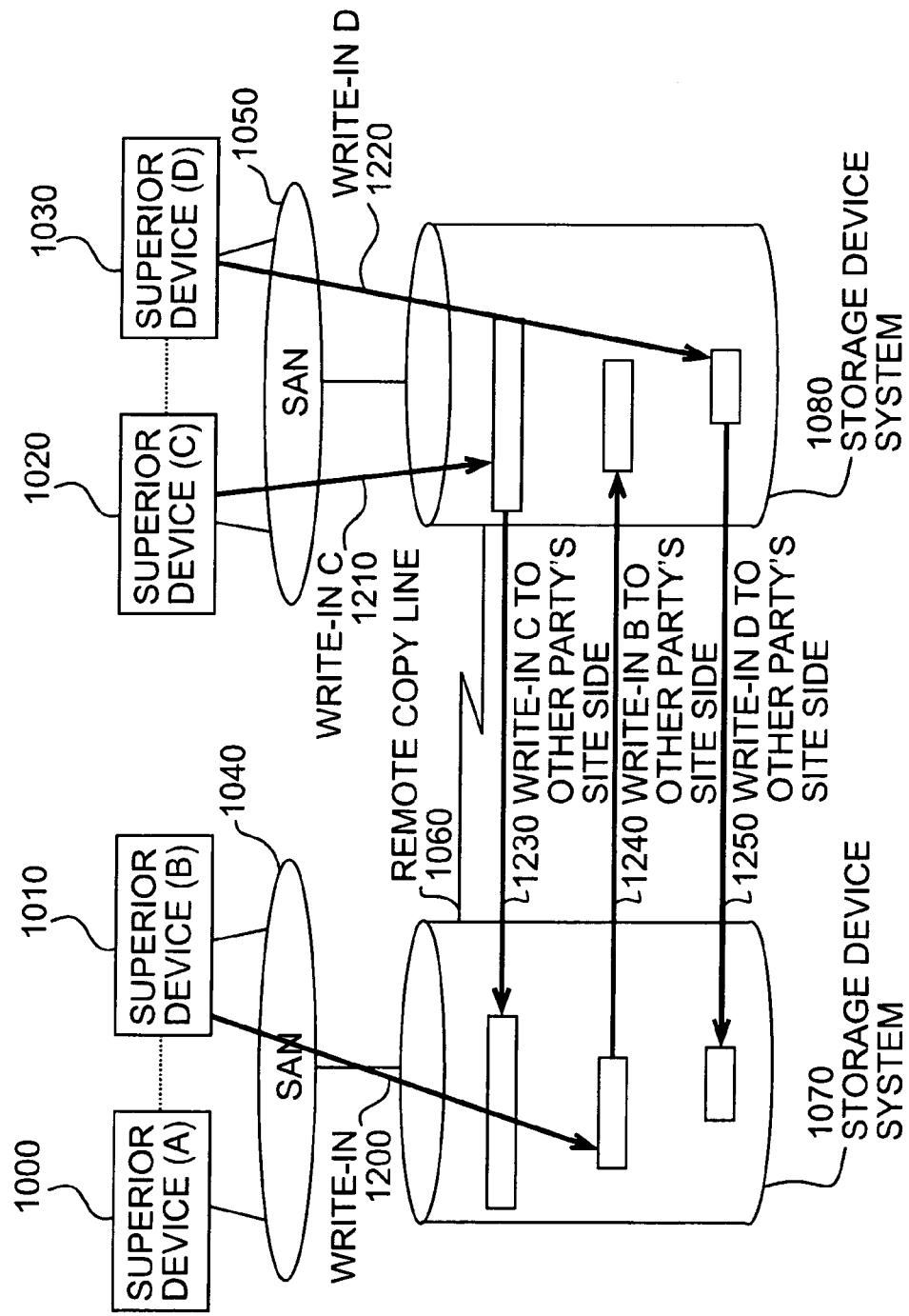
FIG. 2 is a diagram illustrating a bi-directional remote copy function as a mode for carrying out the invention.

FIG. 2 is a view illustrating a situation in which bi-directional copying is carried out in the computer system 1100 shown in FIG. 1. In FIG. 2, the superior device 1010 carries out a write-in B 1200 of data to the storage device system 1070. The data of the write-in B 1200, after it was stored in the storage device system 1070, is transmitted (arrow 1240) through the remote copy line 1060, and it is copied by the storage device system 1080. In the same manner, as to write-in C 1210 from the superior device 1020 to the storage device system 1080, data is also transmitted (arrow 1230) through the remote copy line 1060, and it is copied by the storage device system 1070. In the same manner, as to write-in D 1220 from the superior device 1030 to the storage device system 1080, data is also transmitted (arrow 1250) through the remote copy line 1060, and it is copied by the storage device system 1070. In short, respective write-in operations B 1200, C 1210 and D 1220 of each superior device 1010, 1020 and 1030 are written into storage systems of the respective sites, and then, the data is copied by the storage device systems of other part sites without intervention by the superior devices.

Figure 3:
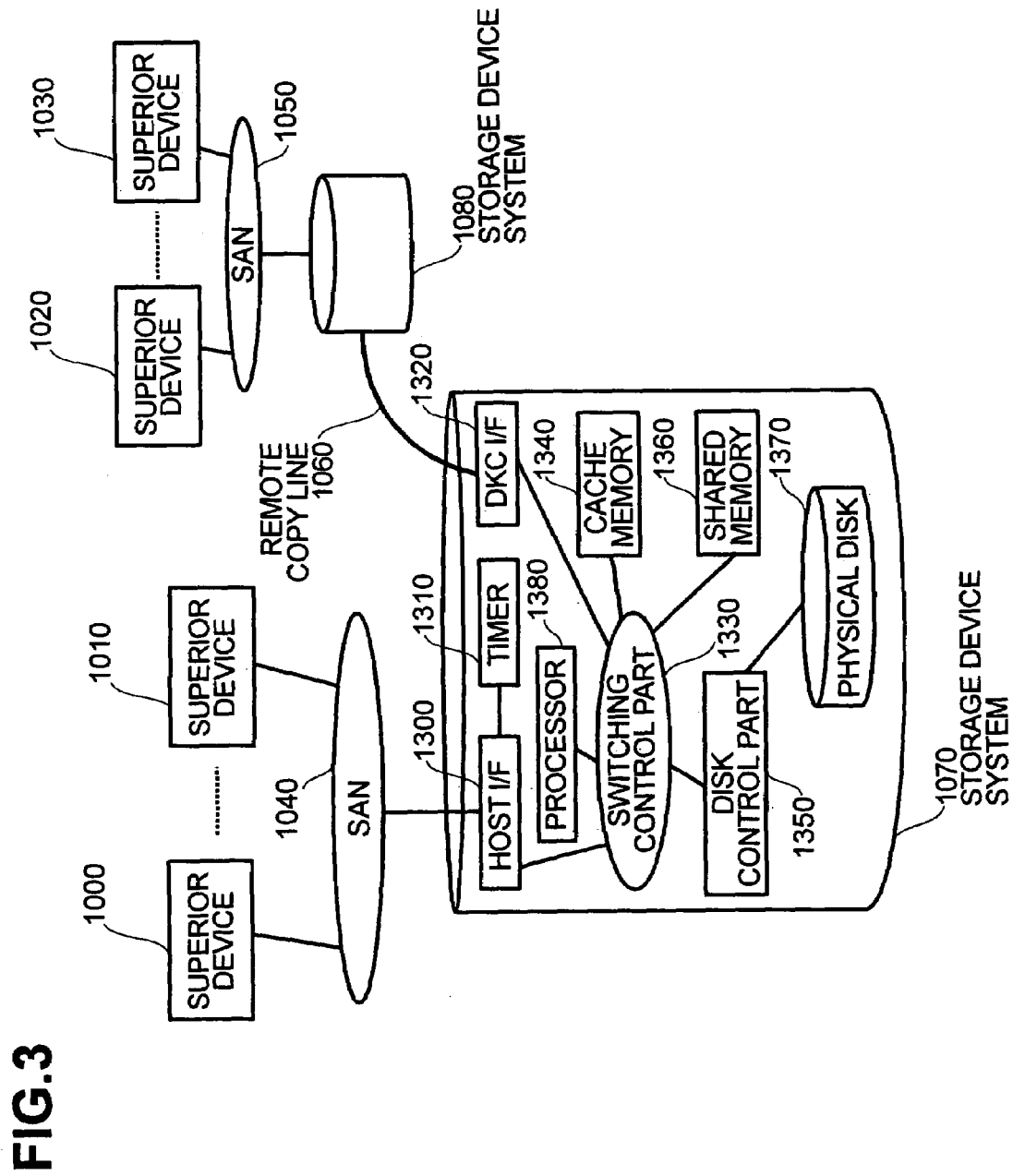
FIG. 3 is a hardware block diagram of a storage device system illustrating a mode for carrying out the invention.

FIG. 3 shows an example of the hardware structure of the storage device system 1070. As an example, the storage device system 1070 may consist of a disk array device, a semiconductor storage device and so on. The storage device system 1070 is configured by a host I/F 1300, DKCI/F 1320, a disk control part 1350, a shared memory 1360, a cache memory 1340, and a switching control part 1330, which is configured as a cross bus switch etc. for connecting these elements in such a manner that they can communicate with each other, as well as a timer 1310, a physical disk 1370 and a processor 1380, and so on.

The host I/F 1300 has a CPU and a memory, and it controls communication with at least one superior device. The host I/F 1300 receives a data I/O request from the superior device and writes the data I/O request into the shared memory 1360. The function of remote copy is provided by executing a program by which the CPU of the DKCI/F 1320 carries out this function.

The cache memory 1340 is mainly used for temporarily storing data which is given and received between the host I/F 1300, the DKCI/F 1320 and the disk control part 1350. For example, in case a data input/output command which the host I/F 1300 has received from a superior device, is a write-in command, the host I/F 1300 writes the write-in data which was received from the superior device into the cache memory 1340. Also, the disk control part 1350 reads out the write-in data from the cache memory 13–40 and writes it into the physical disk 1370.

The disk control part 1350 has a CPU and a memory, and it reads out an I/O request which was written into the shared memory 1360 from the host I/F 1300 and the DKCI/F 1320, and it carries out processes, such as write-in and read-out etc. of data to the physical disk 1370, in accordance with a command which was set in the I/O request (in this, a command of SCSI standard). The disk control part 1350, in case of a read-out command, writes data which was read out from the physical disk 1370, into the cache memory 1340. Also, a write-in completion notice and a read-out completion notice etc. of data are transmitted to the host I/F 1300. There is a case in which the disk control part 1350 has a function for dispersing and locating one logical volume in a plurality of physical disks 1370, in accordance with a so-called RAID (Redundant Array of Inexpensive Disks) system at RAID levels (e.g., 0, 1, 5).

The physical disk 1370 is a physical storage device such as for example, a hard disk device, for finally storing write-in data. The physical disk 1370 may be integrated with the storage device system, and it may be disposed in a separate housing. The DKCI/F 1320 has a CPU and a memory, and it operates as a communication interface for carrying out data transfer with another storage device system, and transfer of data to another storage device system in the remote copy is carried out through this DKCI/F 1320. As an example, each storage device system has one timer 1310, and each timer is adjusted to the same time as much as possible. The timer 1310 is used for storing the time at which the host I/F 1300 conducted reception of an I/O request from a superior device, and so on.

The processor 1380 has a CPU and a memory, and it executes a program (which will be described later) of one other device than the host I/F 1300, KC/F 1320 and the disc control part 1350.

Figure 4:
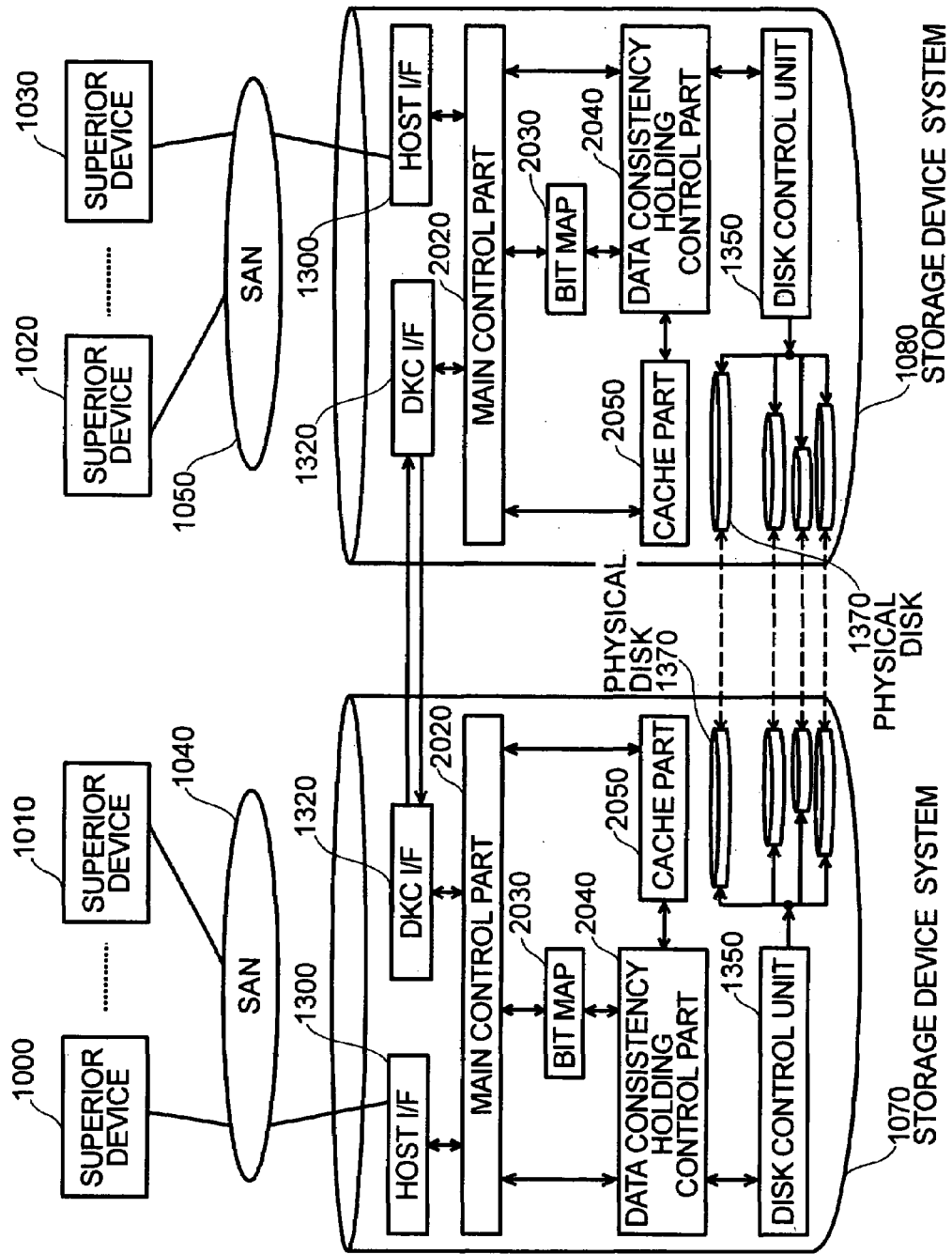
FIG. 4 is a software block diagram of a storage device system representing a first embodiment of the present invention.

FIG. 4 is a view showing software for carrying out a bi-directional remote copy of data according to the invention. In order to realize the bi-directional remote copy feature of the storage device system, each storage device system has a main control 2020, a cache part 2050 and a data consistency holding control part 2040 in the form of programs. These programs are executed by the processor 1380. Also, a bit map table 2030 is disposed in the memory.

The main control 2020 receives an input/output request from the host I/F 1300, activates a data consistency holding control part 2040 and a cache part 2050, and returns a result of the input/output process to the host I/F 1300. Also, it controls handing-over of the input/output request through the DKCI/F 1320.

The bit map table 2030 is bit-mapped so that one block on the physical disk, which is an object of the remote copy, corresponds to one bit. The bit map table 2030 has two states, consisting of a bit value 0 and a bit value 1. The value 0 represents a situation in which the data of a block of a disk corresponding to the pertinent bit is not cached in the cache memory 1340. The value 1 represents a situation in which data of a block of a disk corresponding to the pertinent bit is cached in the cache memory 1340, and there is latest data on the cache.

The cache part 2050 is a program which carries out a process for writing the write-in data from the host I/F 1300 and the DKCI/F 1320 into the cache memory 1340. As to the cache, there is a read-cache other than a cache for write-in data. The read-cache technology is such that, on the occasion that a superior device reads data in a storage device system, in order to enable handing-over of the read-data to the superior device quicker than reading reference data by directly accessing the physical disk 1370, data which is accessed frequently is held as cache data in the cache memory 1340. However, in this mode for carrying out the invention, in order to clarify the features of this invention, the cache part 2050 is described as being used for carrying out only cache control of the write-in data.

The data consistency holding control part 2040 is activated when the input/output request is one which relates to data write-in, and it effects control in such a manner that the consistency of data is held between storage device systems in which the bi-directional copying is carried out, on the basis of the bit map table 2030.

The write-in data from the host I/F 1300 and the DKCI/F 1320 to the storage device system, after it was held for a predetermined time in the cache memory 1340, is written through the disk control part 1350 into the physical disk 1370. The data consistency holding control part 2040 controls the monitoring time for holding the write-in data in the cache. This time is made to become a sufficiently longer time, considering the transfer time during which write-in data is transmitted to a copy destination and the time for a control process in this invention.

In this embodiment, it is held on the cache memory 1340 for 3 minutes from such time that the host I/F 1300 received a write-in request from a superior device. The data consistency holding control part 2040 effects control in such a manner that the write-in data which exists in the cache memory 1340 for more than 3 minutes is written into the physical disk 1370 simultaneously at almost the same time between storage device systems which constitute the copy pair. This simultaneous write-in is carried out every 1 minute. For example, when the time is 00 hour 00 minute 00 second, 00 hour 01 minute 00 second, and 00 hour 02 minute 00 second, simultaneous write-in is carried out. In short, data which was cached in the cache memory 1340 for more than 3 minutes and less than 4 minutes is written into the physical disk 1370, on the occasion of a write-in process to a disk at time 00 second. Hereinafter, this write-in process to the physical disk 1370, which is carried out every 1 minute, is called a "simultaneous write-in process".

On the occasion of writing data into the physical disk 1370, the timers 1310 in the storage device systems of the copy pair are synchronized with each other so as to become the same time as much as possible, and write-in is controlled in such a manner that contents to be written into the physical disk 1370 become completely the same after a lapse of 3 minutes. In this way, each storage device system writes the same data into the physical disk 1370 at almost the same time.

FIG. 5 shows the a data format of a data consistency holding table 100 which is held by the data consistency holding control part 2040. The data consistency holding table 100 is configured of a table control number 101, reception time 102, superior device identification number 103, object block start address 104, object size 105, storage serial number 106 and cache data storage address 107.

The reception time 102 identifies the time that the host I/F 1300 received the write-in data from the superior device. The superior device identification number 103 is an identification number of a superior device by which write-in was carried out to a storage device. This identification number is unique with respect to each superior device and is, for example, an IP address, WWN (World Wide Name) which is used for to a fiber channel, and so on. The object block start address 104 and the object size 105 represent a block number of an object for write-in and the number of write-in blocks, respectively. The storage serial number 106 is a unique value which is given with respect to each storage device system, and it becomes a value which represents which storage device system has received a write-in request from a superior device. The cache data storage address 107 is an address of the cache memory 1340 in which the write-in data is stored. The cache data storage address 107, when a data storage-region is secured on the cache memory 1340 by use of malloc, etc. of the C language, indicates its head address (The deletion of data in the cache can be carried out by free, etc. of the C language).

The data consistency holding table 100 is sorted in chronological order using the reception time 102 as the basis, and the latest record (or entry) is arranged to come at the tail end of the table. The table control number 101 is supposed to store integer control numbers from the head of the table in a sequence of 1, 2, 3, . . . . The control number 1 is a record which represents the chronologically oldest table in the cache memory 1340, and records are arranged in such a manner that a record with the largest control number becomes a write-in record having the most recent time. Since a record which is next to the record with the largest control number is an unregistered entry, its control number is replaced with −1.

In the specific example illustrated in FIG. 5, at present, 100 records are registered in the data consistency holding table 100. Each record is sorted in ascending sequence from the oldest one according to the reception time 102. The table control number 10-1 is assigned in order, up to 100, from 1 as a number of a head record. There exists no record which is one below 100 as the table control number 101. The table control number 101 of this unregistered record storage region is replaced with −1.

FIG. 6 shows the data format of the bit map table 2030. Each column of the bit map table 2030 is arranged in the order of a block, corresponding to a block on the physical disk. The bit value 1 or 0 is set in each column, and, as indicated above, it shows whether or not data of the block is cached. The temporary bit map table 200 is a table for storing a bit map of a block, which is a target of an input/output operation of the input/output request from the superior device.

Figure 7:
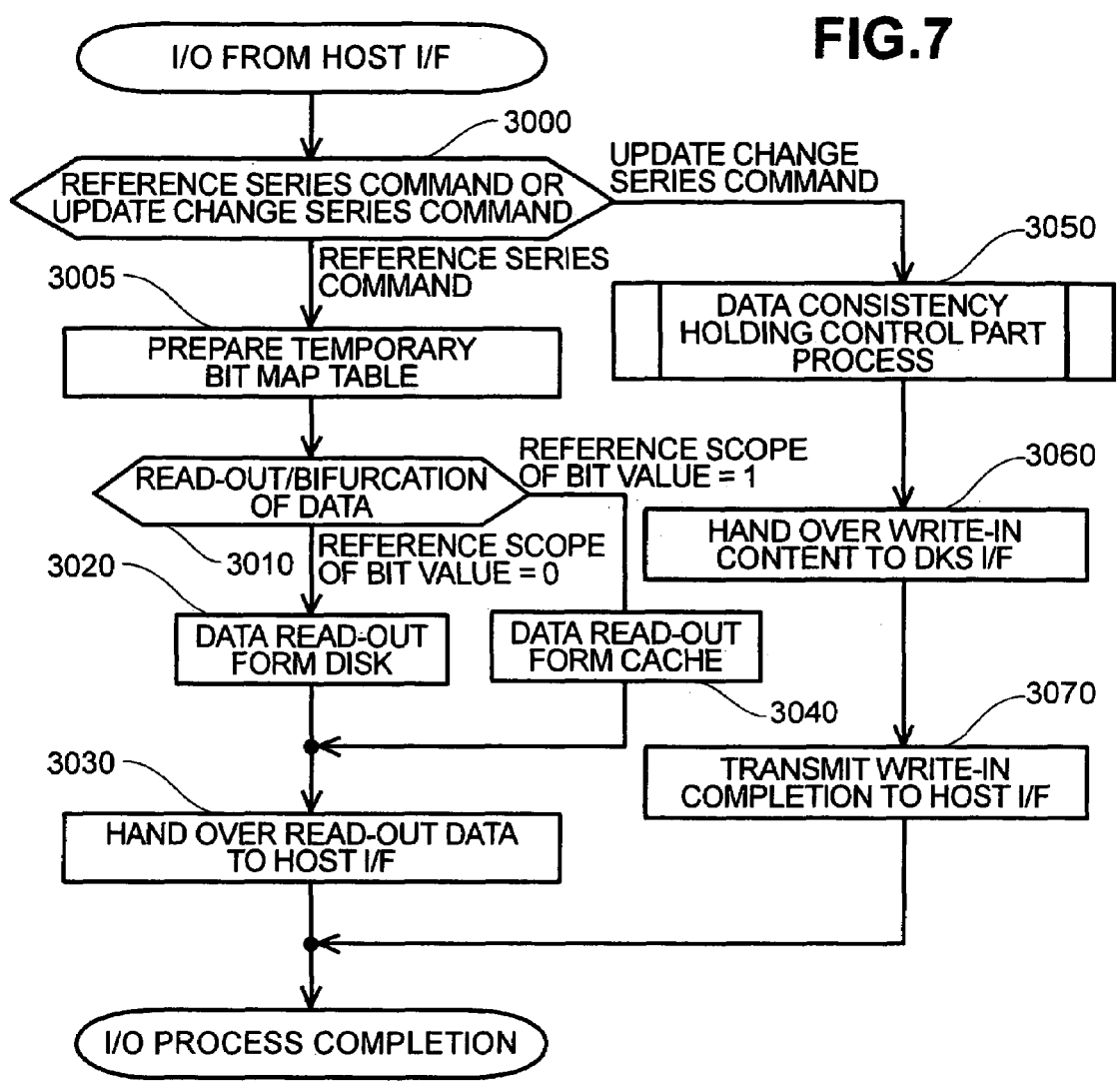
FIG. 7 is a flow chart showing process procedures for processing an I/O operation which was received from a host I/F in the first embodiment.
Figure 8:
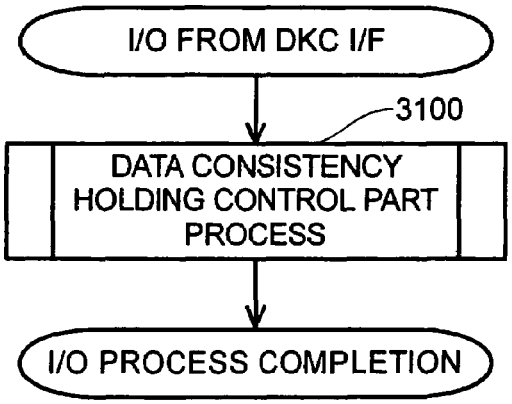
FIG. 8 is a flow chart showing process procedures for processing an I/O operation which was received from the DKCI/F of the first embodiment.

With reference to FIGS. 7 and 8, the process procedures of the main control part 2020 will be described. The main control part 2020 processes the input/output request (hereinafter, referred to as I/O) which was received from the host I/F 1300 and DKCI/F 1320. The I/O request from the host I/F 1300 is an I/O request from a superior device, and the I/O request from DKCI/F 1320 is an I/O request from another storage device system. Here, a process regarding the request from the host I/F 1300 is shown in FIG. 7, and a process regarding the request from the DKCI/F 1320. is shown in FIG. 8.

FIG. 7 is a flow chart showing an example of the process procedures of the main control part 2020, which processes an I/O request from the host I/F 1300. When the I/O request has come from the host I/F 1300 to the storage device system, at a step 3000, a reference series command (command such as read in SCSI) is discriminated from an update change series command (command such as write in SCSI), and the processes are bifurcated. In this embodiment, attention is paid only to the reference series command and the update change series command. In the case of the reference series command, the process goes to a step 3005. In the case of the update change series command, the process goes to a step 3050.

In a step 3005, reference is made to bit values of the bit map table 2030 which correspond to a reference scope (reference block start address, the number of blocks) which is requested by the superior device, and they are temporarily copied in the bit map table 200. After the temporary bit map table 200 has been prepared, a process goes to a step 3010. In the step 3010, it is judged whether the most recent content exists in the cache memory 1340 or in the physical disk 1370, in a block address which is indicated by the temporary bit map table 200.

In the reference scope which is requested by the superior device, a storage location of the most recent data is changed between a block scope of, the bit value 0 and a block scope of the bit value 1 of the temporary bit map table. 200. When the reference request in the block scope of the bit value is 0, a situation exists in which data on the physical disk 1370 is the most recent data, and the process goes to a step 3020. When the reference request in the block scope of the bit value is 1, a situation exists in which data-on the cache memory 1340 is the most recent data, and the process goes to a step 3040. The step 3020 is a process for reading reference scope data through the disk control part 1350. The step 3040 reads the reference scope data through the cache part 2050. On the occasion of referring to data through the cache part 2050, by use of the data consistency holding table 100, data in a reference object scope is read. More specifically, as to records of the data consistency holding table 100, in the order from the largest one toward a smaller one of the table control number 101, the reference scope and the object block address 204, the object size 205 are compared, and an address of the cache memory 1340, in which changed data is cached is searched, and the reference scope data is read from the cache memory 1340.

After the step 3020 and the step 3040, in a step 3030, respective read-in data are joined as read-in data of the block scope of the temporary bit map table 200, and this data is handed over to the host I/F 1300. After the data has been handed over to the host I/F 1300, the I/O process is complete. The host I/F 1300 transmits the read-in data which was handed over to the superior device from which the reference request was issued.

The step 3050, step 3060 and step 3070 are processes which are carried out on the occasion of having received the update change command from the host I/F 1300. On the occasion of carrying out write-in to data in the storage device system, the data consistency holding control part 2040 carries out the processing, and, therefore, the main control part 2020 carries out a process for handing over data to the data consistency holding control 2040 and for communicating completion of a process of data transmission to a remote copy destination storage device system and an update change to the host. In case of data transmission to the remote copy destination storage device system, the main control part 2020 transmits, in addition to the data which was written, information of the reception time 102, which is an item of the data consistency holding table 200, the superior device identification number 103, the object block start address 104, the object size 105, and the storage serial number 206. Here, although it is not particularly described as to a transmission method, a vendor specific command which was formed by expanding a write command of SCSI may be used.

The step 3050 is a process of the data consistency holding control part 2040, and the details thereof will be described later. After the step 3050, the process goes to the step 3060, and write-in data is handed over to the DKCI/F 1320. The DKCI/F 1320 transmits this write-in data to the DKCI/F 1320 of a copy destination storage system. After that, the process goes to the step 3070. The step 3070 carries out a write-in completion report to the host I/F 1300. The host I/F 1300 carries out notification of the write-in completion to the superior device which carried out the write-in request.

FIG. 8 is a flow chart of a process which is carried out when the main control part 2020 has received write-in data from the DKCI/F 1320. A step 3100 is a data consistency holding control part process.

Figure 9:
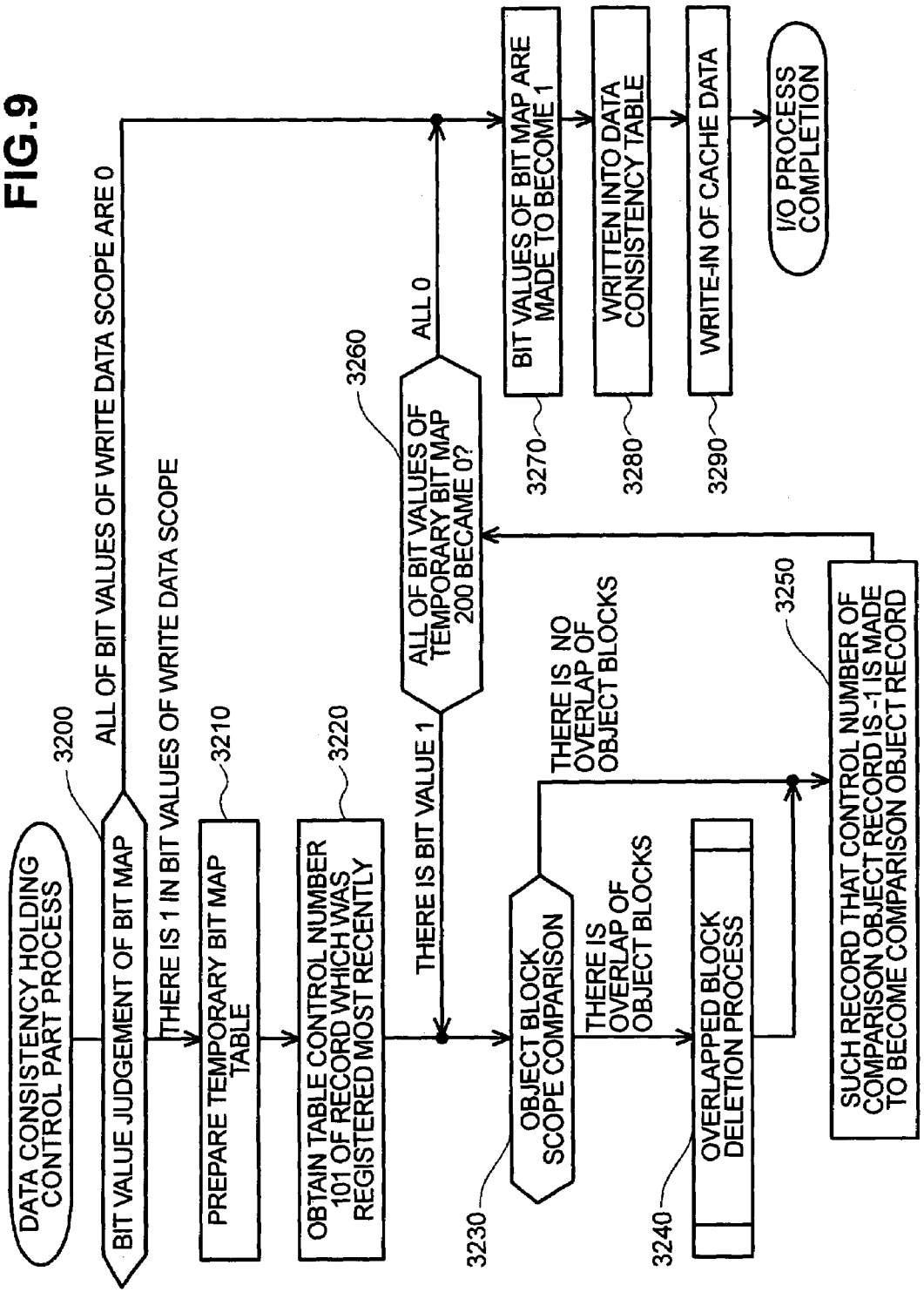
FIG. 9 is a flow chart showing the processing at the time of a write-in request of a data consistency holding control part of the first embodiment.

FIG. 9 is a flow chart in the case where the data consistency holding control part 2040 has processed the write-in request from the superior device. The data consistency holding control part 2040 is a control part which carries out a process of write data (write-in content), so that a logical volume for forming the remote copy pair becomes a volume which was completely duplicated. The data consistency holding control part 2040 updates the data consistency holding table 100 and the bit map table 2030, and carries out a process for writing the write data on the cache memory 1340.

A step 3200 investigates whether or not there is a bit of the bit value 1 in a scope of the bit map table 2030 which corresponds to a write-in scope of the write data (block start address, and the number of blocks of a disk). As a result of this, in the case where the control of the bit map in a scope of the write data is all the bit value 0, the process goes to a step 3270. In case there is the bit value 1 even partially in the scope of the write data (in case that data of the same block as the write-in block of the write data is cached on the cache), the process goes to a step 3210.

In the step 3210, the data consistency holding control part 2040 prepares the temporary bit map table 200, which has bits of the number of written blocks. The temporary bit map 200 corresponds to the write-in block of the write data, and the head of the temporary bit map 200 corresponds to a write-in head block of the write data. In the step 3210, referring to the bit map table 2030, a bit value in a scope of the write data is copied in the temporary bit map table 200 which was prepared. After the copy, the process goes to a step 3220.

The step 3220 searches a record which was written most recently of the data consistency holding table 100. In the search for the record which was written most recently, the data consistency holding table 100 is searched from the top in sequence, and an entry one above the entry in which the table control number became −1 is entered. The table control number 101 of the record searched is put into a variable "current" on the memory. Current is made to become a variable which can be replaced with an integer. After the table control number was replaced in the current, the process goes to a step 3230.

Processes from the step 3230 to a step 3260 become a loop process, and a loop completion condition occurs when the bit values of the temporary bit map table 200 become all 0. Hereinafter, procedures for making the bit values 0 will be described. The write-in data of the temporary bit map table 200, in which the bit value corresponds to 1, to the block has already existed on the cache memory 1340. Thus, by detecting a record of the data consistency holding table 100, all of overlapped data (data of the bit value 1 in the temporary bit map table 200) on this cache memory 1340 are searched, and a bit value of the temporary bit map table 200, which corresponds to a scope of overlap of the record which was found in the search is made to become 0. Also, an overlapped block deletion process 3240, which will be described later, is carried out in a scope of the overlapped data. By searching each record of this data consistency holding table 100, a process for making the bit values of the temporary bit map table 200 to be 0 is carried out. When all of the bit values of the temporary bit map table 200 become 0, the loop process is completed.

The step 3230 judges whether or not there is a portion overlapped with a write-in scope of the write data, by use of the object block start address 104 and the object size 105 of a record in which the table control number 201 of the data consistency holding table 100 is in agreement with the variable current (hereinafter, referred to as the "current record"). As a result of the judgment, in case there is no overlapped portion, the process goes to a step 3250. In case there is an overlap, the process goes to a step 3240. After the overlapped block deletion process of the step 3240 has been completed, the process goes to the step 3259. The step 3250 is a process for changing the current record, which is a comparison object record, to a record one above the same. More specifically, it is fine if a variable value of the current is made to become −1. After the value of the variable has been changed, the process goes to a step 3260. The step 3260 is a process for carrying out a completion condition judgment of the loop process, and it judges whether all of the values of the temporary bit map table 200 become 0.

In case all of the bit values of the temporary bit map table 200 become 0, the process goes to a step 3270. In case that 1 remains in the bit values, the process goes to the step 3230, which is the head of the loop. The step 3270 is a process for changing all of bit values of the bit map table 2030 which corresponds to the write-in scope of the write data to 1. After the process has been completed, the process goes to a step 3280. In the step 3280, the data consistency holding control part 2040 writes information regarding the write data into the data consistency holding table 100. More specifically, a value of the table control number +1 of a most recently written record is written into the table control number 101. −1 is written into the table control number 101 one row below it, and furthermore, on the basis of information of the write data, the reception time 102, the superior device identification number 103, the object block start address 104, the object size 105, the storage serial number 106 and the cache data storage address 107 are written, respectively. After the data consistency holding table 100 has been updated, the process goes to a step 3290. The step 3290 writes the write data into an address which was set in the cache data storage address 107 on the cache memory 1340. After the write-in has been completed, the process of the data consistency holding control part 2040 is completed.

Figure 10:
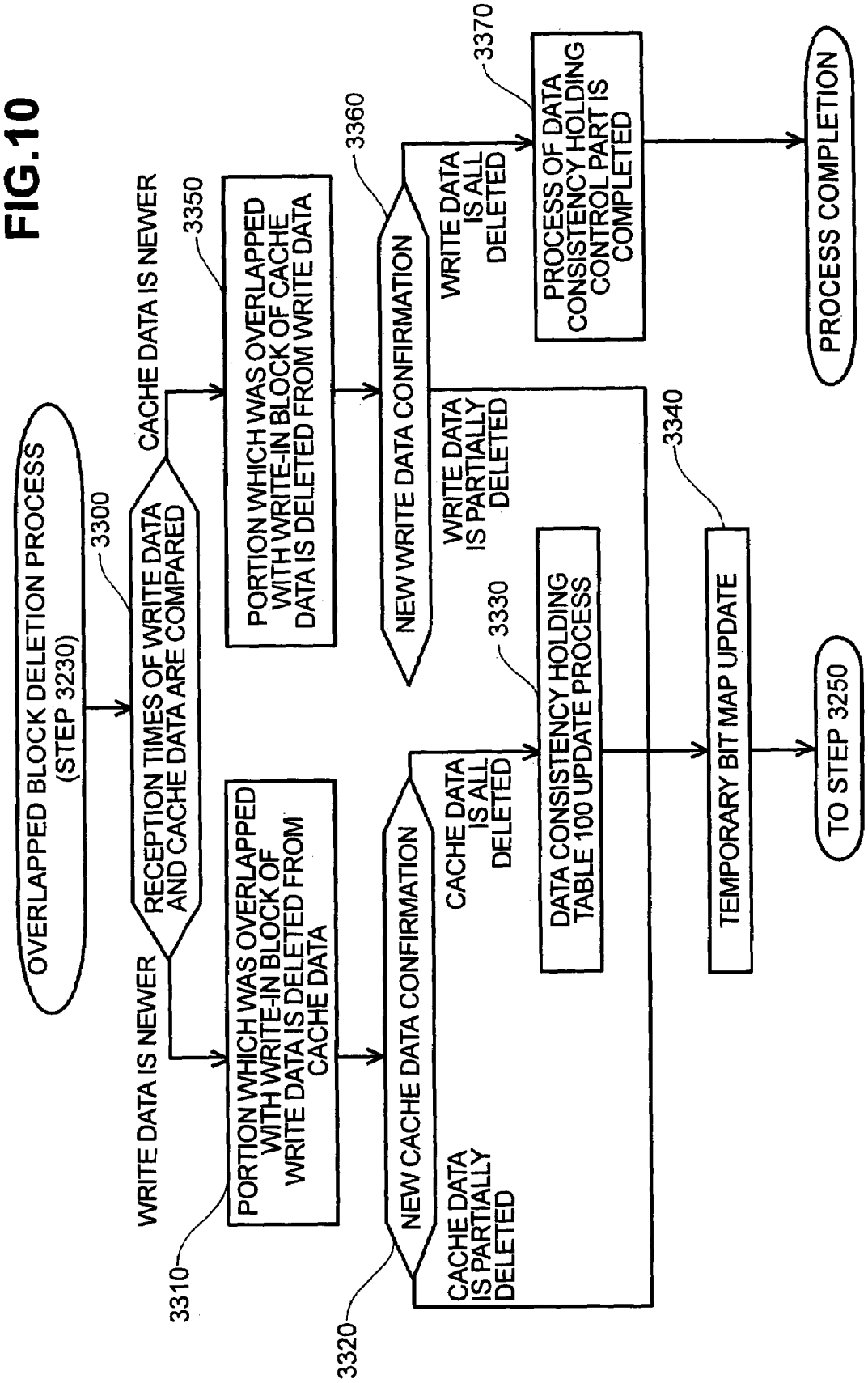
FIG. 10 is a flow chart of a doubled block deletion process of the data consistency holding control part of the first embodiment.

FIG. 10 is a flow chart showing an overlapped block deletion process. The overlapped block deletion process is a process which is carried out in case there is an overlap between a write-in scope of the write data which is requested to be written into the storage device system and a write-in scope of the cache data which exists on the cache memory 1340. The fact that there is an overlap means that the write data overwrites the cache data or the cache data overwrites the write data. The overlapped block deletion process is a process used for deleting a portion which is overwritten and updated in this overlapped scope.

(a) Case where the write data overwrites the cache data.

Normally, in an environment in which the remote copy is not used and so on, cache write-in is carried out in the order of the write data which was received by the host I/F 1300. Thus, the write data becomes the most recent data, and the write data overwrites the cache data.

(b) Case the cache data overwrites the write data.

There is no guarantee that the write data which was received by the DKCI/F 1320 is the most recent write-in data. This is write data which was transferred through the remote copy line 1060, after the write data was written into the remote copy destination storage device system, and time has already passed since the reception time 102. Thus, there occurs a case in which the cache data becomes the most recent data rather than the write data. In this case, the cache data becomes the most recent data, and the cache data overwrites the write data.

In a step 3300, the times (reception times 102) that the write data and the cache data were received by the host I/F 1300 are compared. In case that the reception time of the write data is newer (more recent as time), the process goes to a step 3310. In case that the reception time of the cache data is newer, the process goes to a step 3350. On the occasion of comparing times in this embodiment, a process in which completely the same times are compared is not included. Such a case in which the same times are compared occurs when write-ins are applied to the same region simultaneously as a result of having measured in, for example, the storage device system 1070 and the storage device system 1120. As a process on this occasion, an avoidance measure is conceivable in which a priority storage device system has been determined in advance, and if the times are completely the same, write-in of the priority storage device system side is made to come first, and so on.

The step 3310 involves a process for deleting an overlapped portion with a write-in area of the write data as to the cache data which was compared. By this deletion process, record values of the deletion object data on the cache memory 1340 and the object block start address 104, the object size 105 and the cache data storage address 107 of the data consistency holding table 100 are changed.

Here, there is a case which requires an exceptional process. This exceptional process is carried out in case that, by a partial deletion of the cache data, an intermediate portion of the cache data is extracted, and the cache data is divided into two records. More specifically, it is supposed that the object size 105 is 20 blocks from the object block start address 104 of the cache data as a deletion object: 1000 address. In case that a write-in request of the object size 105: 100 blocks came there from the write data object block start address 104: address 1020, a record which was written in the data consistency holding table 100 of the cache data, due to deletion of the overlapped portion with the write data, (the object block start address 104, the object size 105) is divided into two records of (1000, 19), (1121, 79). A division process which is carried out here gets down a record after the record which is represented by current cache data by 1 row, and changes (+1) the control number to the record in which the table control number 101 was gotten down. By use of the record row which was prepared by this process and is 1 row below, the cache data is divided into two records.

A step 3320 judges whether all of the cache data has been deleted or not, as to the cache data which was changed in the step 3310. Such a situation in which all the data has been deleted is a situation in which the write-in scope of the cache data is completely included in the write-in scope of the write data, and all of the cache data is deleted. When apart of the cache data has been deleted, the process goes to a step 3340. When all of the cache data has been deleted, the process of a step 3330 is carried out. The step 3330 deletes a record row of the cache data of the data consistency holding table 100 which was compared, since all of the cache data which was compared has been deleted. After the deletion, a record of 1 row behind and downward is shifted up by 1 row, and the table control number 101 of the shifted record is changed (−1).

A step 3350 carries out a process for deleting an overlapped portion with the write-in scope of the cache data which was compared with the write data. By this deletion process, the size of the write data gets smaller, and it is to have new object block start address 104 and object size 105. In case that the write data was divided, a write-in process is applied to the divided write data as a separate write-in, respectively.

A step 3360 judges whether all of the write data has been deleted or not, as to the write data which was changed in the step 3350. A situation in which all of the write data has been deleted is a situation in which the write-in scope of the write data is completely included in the write-in scope of the cache data, and all of the write data has been deleted. When apart of the write data was deleted, the process goes to a step 3340. When all of the write data has been deleted, the process goes to a step 3370.

The step 3340 applies 0 to each of the bit values of the temporary bit map table 200 which corresponds to the overlapped block processed in the step 3310 or the step 3350. After the change of the bit values, the process goes to the step 3250. The step 3370 completes a write-in process of the write data of the data consistency holding control part, since all of the write data has been deleted and there is no content to be written.

Figure 11:
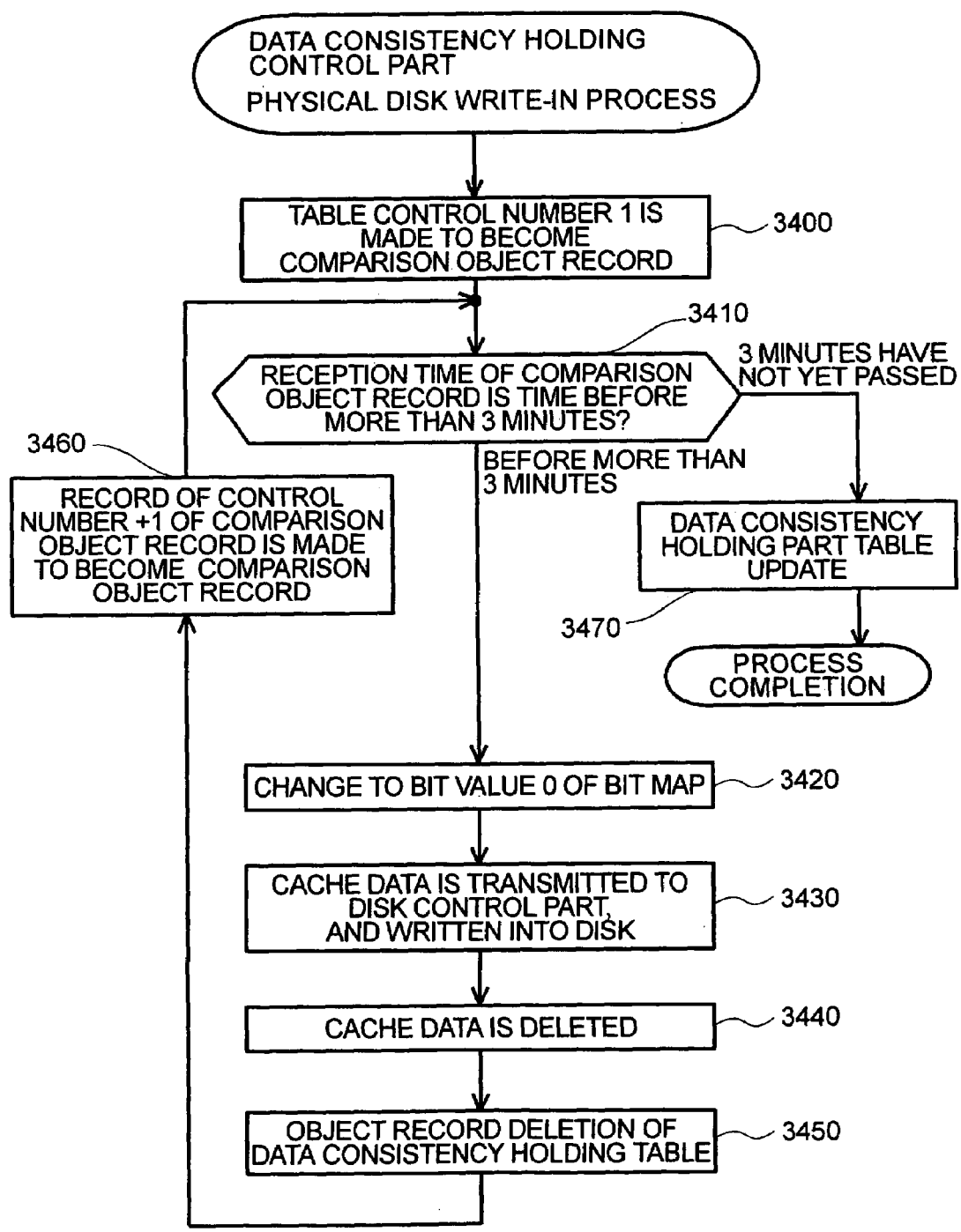
FIG. 11 is a flow chart of a simultaneous write-in process of the data consistency holding control part of the first embodiment.

FIG. 11 is a flow chart showing a process (simultaneous write-in process) of the data consistency holding control part 2040 for writing the cache data in the cache memory 1340 to the physical disk 1370. The simultaneous write-in process is activated simultaneously in all storage device systems once every 60 seconds by the timer 1310. The step 3400 replaces the variable current with 1 of the table control number 101 which is the oldest written record in the data consistency holding table 100. After the substitution, the process goes to the step 3410. In the step 3410, the table control number 101 refers to the reception time 102 of the current record. When the reception time 102 of the current record has not passed 3 minutes since the simultaneous write-in process start time, a process goes to the step 3470, and when more than 3 minutes pass, the process goes to a step 3420.

The step 3420 changes bit values of the bit map table 2030, which shows the write-in scope of the current record, to all 0. After the change, the process goes to a step 3430. In the step 3430, the data consistency holding control part 2040 hands over the write-in data (data in the cache memory 1340 which was designated by the object block start address 104, the object size 105 and the cache data storage address 107) of the current record to the disk control part 1350. The disk control part 1350 writes the write-in content of the current record into the physical disk 1370. After the data has been handed over to the disk control part 1350, the process goes to a step 3440.

The step 3440 deletes the cache data on the cache memory 1340 which was handed over to the disk control part 1350. After the deletion, the process goes to a step 3450. The step 3450 carries out deletion of a record on the data consistency holding table 100 which is indicated by the current record. The deletion of the current record row involves deletion of information which is written into the table control number 101, the reception time 102, the superior device identification number 203, the object block start address 104, the object size 105, the storage serial number 106 and the cache data storage address 107 of the current record of the data consistency holding table 100, respectively. After the deletion of the deletion current row of the current record has been completed, the process goes to a step 3460. The step 3460 applies +1 to the variable value of the current. The record which is indicated by the current becomes a record which was written next to the record which was written in the physical disk 1370 this time. And, the process returns to the step 3410, and it is judged whether the current record is a simultaneous write-in process object record or not.

The step 3470 updates the data consistency holding table 100. The records close up upward in sequence so that the head record of the table does not become an unused record, and the table control number 101 is assigned again from an upper record like 1, 2, 3, . . . in sequence. After the change of the data consistency holding table 100, the process is complete.

Also, as a modified example of the first embodiment, an embodiment in which the bit map table 2030 is not provided is possible. In that case, the data consistency holding control part 2040 does not consider the overlapped block in the cache memory 1340, and it stores the write-in data as it is in the order of the reception time. The data consistency holding control part 2040 carries out write-in to the data consistency holding table 100 in the step 3280 and write-in of the cache data in the step 3290. There is no overlapped block deletion process. Also, the steps 3010, 3020 and 3040, in the case in which the storage devices system has received a reference series command from a superior device, operate to search the data consistency holding table 100 in sequence from the most recent record, and in accordance with the reference scope in which the write-in data exists in the cache memory 1340, data is read out from the cache memory 1340, and in accordance with the reference scope in which the write-in data does not exist in the cache memory 1340, data is read out through the disk-control part 1350 from the physical disk 1370.

(2) SECOND EMBODIMENT

In the first embodiment, in the process of write-in of the write data, in the step 3060, the write-in content is handed over to the DKCI/F 1320. Here, completion of the write-in process of the copy destination storage device system is not waited for. In the step 3070, the consistency of data in the volumes of the copy pair changes, depending upon whether the write-in process completion of the copy destination storage device system is waited for, or is not waited for.

In the first embodiment, before the write-in process completion to the copy destination storage device system is completed, write-in completion to a superior device is communicated. However, the write-in process to the copy destination storage device system requires a data transfer time of the remote copy and a time for carrying out the actual write-in process. During the time which is required for this process, the write-in content differs between the copy destination storage device system and the copy source storage device system. In case completely duplicated volumes are formed as the remote copy pair, in the step 3070, the write-in completion notice of the copy destination storage device is waited for. In case of an environment with no influence even if consistency is lost with regard to data which was written for the time which is required for the write-in of the copy destination storage device system, the main control part 2020 communicates the write-in completion to the host I/F 1300, without waiting for the write-in completion of the copy destination storage device system.

(3) THIRD EMBODIMENT

Figure 12:
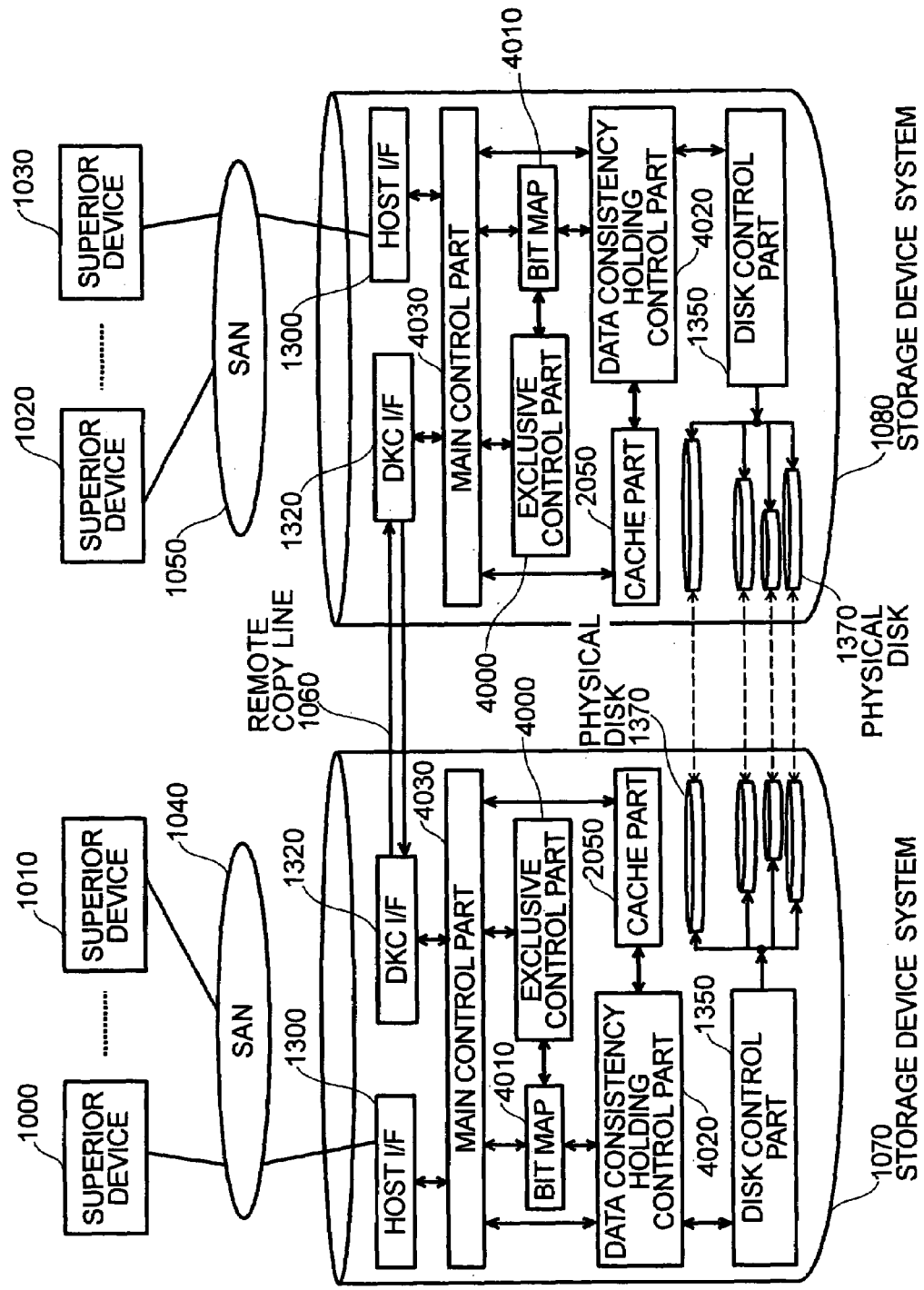
FIG. 12 is a software block diagram of a storage device system according to a third embodiment.

The third embodiment achieves a propagation of reserve information by modification of the second embodiment. The third embodiment is applied in case of carrying out an exclusive access of the disk region by reservation of the region. FIG. 12 shows a system structure of the third embodiment for propagating reserve information of a SCSI to the storage device system, which is a target of remote copy.

The system of FIG. 12 has an exclusive control part 4000, a data consistency holding control part 4020 and a main control 4030 in the form of programs. These programs are executed by the processor 1380. Also, on a memory, a bit map table 4010 is provided. Other structural elements are the same as in the first embodiment.

The exclusive control part 4000 holds a lock state, holding table 400, and it manages a reserve state from a superior device. The exclusive control part 4000 effects control in such a manner that each of the storage device systems which become objects of the bi-directional remote copy have lock state holding tables 400 of the same content. By having lock state holding tables 400 of the same content, on the occasion that a superior device has locked a volume of a certain storage device system, a pair volume of the other site which constitutes the copy pair is turned in a locked state.

The bit map table 4010 has four states which represent the bit map, as compared to the bit map table 2030. In this way, the bit map table 4010 holds the state of the disk by 2 bits, but not by the bit map of 1 bit to 1 block of the disk. Here, it is not "a bit map" which is normally used, but in this embodiment, it is called a bit map.

In the data consistency holding control part 4020, there is a change of a bifurcation condition of a process due to the bit value by increase of the bit value which is taken by the bit map (increase of states which is possessed by the bit map) as compared to the data consistency holding control part 2040. In the main control part 4030, there is a change of a process due to the fact that the host I/F 1300 and the DKCI/F 1320 receive and process the reserve series command, other than the reference command and the update change series command, as compared to the main control part 2020.

The bit map value table 300 of FIG. 13 illustrates the meaning of the states which are represented by a bit value 0, bit value 1, bit value 2 and bit value 3 in the bit map table 4010. The bit value 0 indicates a state in which the disk is not reserved in any superior device, and data of the physical disk 1370 is the most recent one. The bit value 1 indicates a state in which the disk is not reserved in any superior device, and data of the cache memory 1340 is the most recent one. The bit value 2 indicates a state in which the disk is reserved in a certain superior device, and data of the physical disk 1370 is the most recent one. The bit value 3 indicates a state in which the disk is reserved in a certain superior device, and data of the cache memory 1340 is the most recent one.

FIG. 14 shows the data format of a lock state holding table 400 which is held by an exclusive control part 4000. The lock state holding table 400 is configured by such items as a control number 401, a lock start time 402, a superior device identification number 403, a lock object start address 404 and a lock object size 405. The lock start time 402 indicates the time that a lock request was received from a superior device to the host I/F 1300 in the storage device system. The superior device identification number 403 has the same meaning as the superior device identification number 203 of the data consistency holding table 100. The lock start address 404 and the object size 405 set a block address and the number of blocks of a disk which becomes a lock object, respectively. The control number 401 is supposed to store integer control numbers from the head of a table in a sequence of 1, 2, 3, . . . The control number starts from 1 and increases with +1 at a time, and the control number next to a final record is set to −1.

Figure 15:
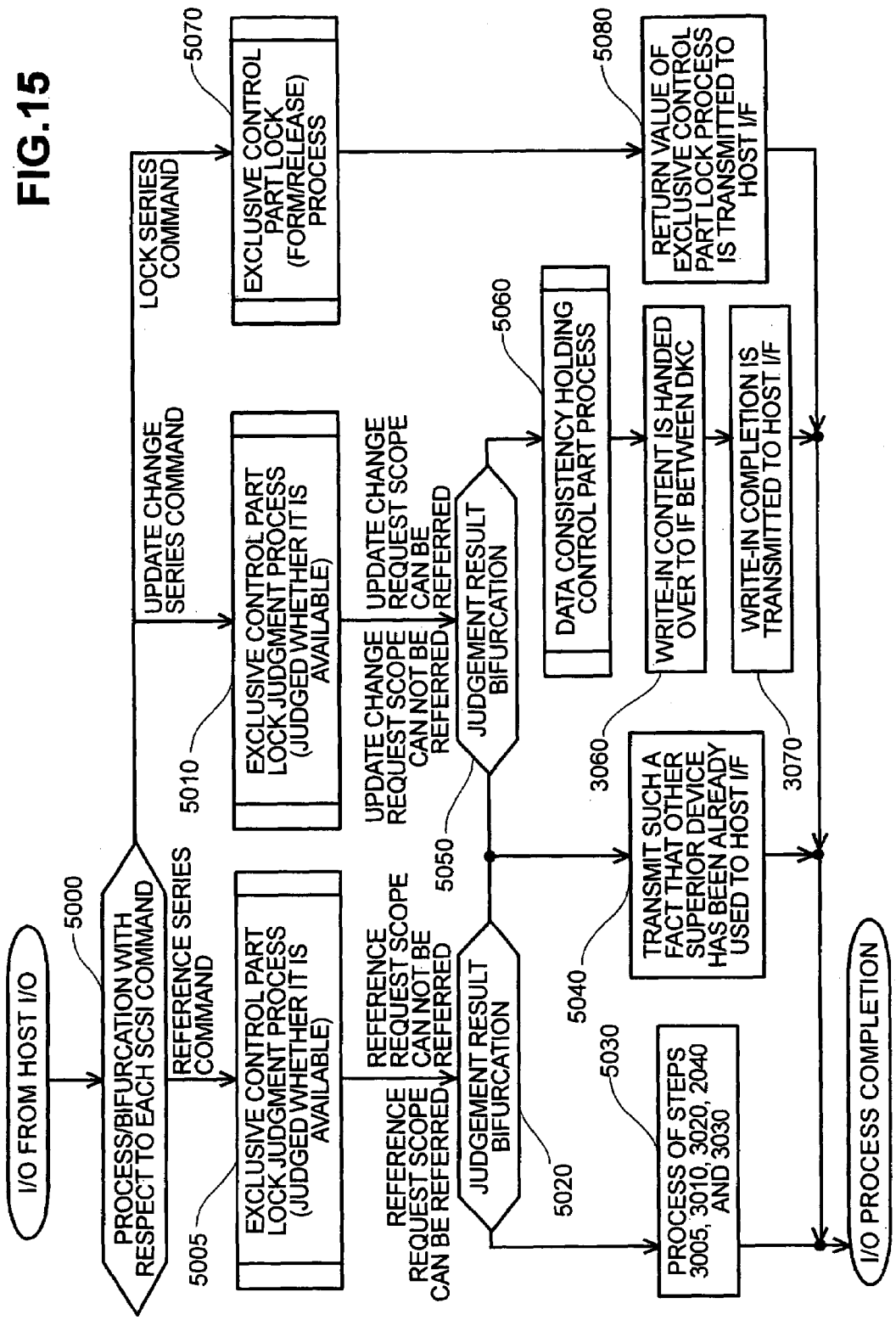
FIG. 15 is a flow chart showing the processing of an I/O request which was received from a host I/F of the third embodiment.
Figure 16:
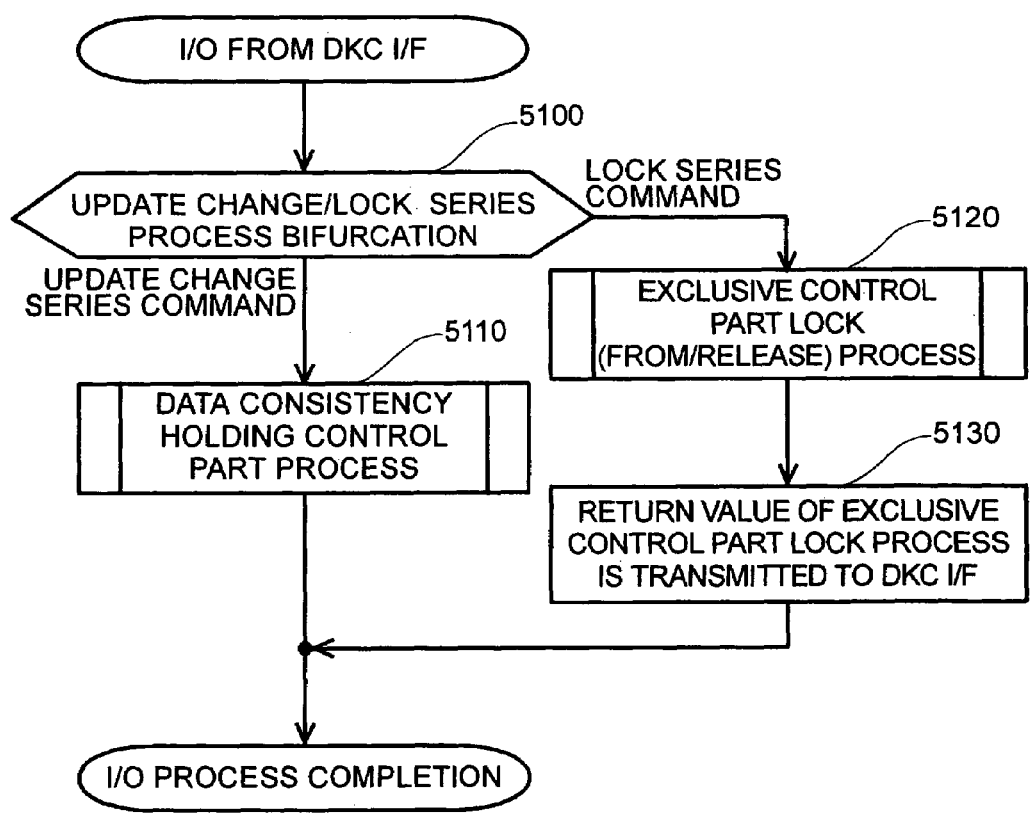
FIG. 16 is a flow chart showing the process procedures for processing an I/O request which was received from the DKCI/F of the third embodiment.

FIGS. 15 and 16 are flow charts showing process procedures of the main control part 4030. FIG. 15 shows an example in which a modification was made to FIG. 7, and FIG. 16 shows an example in which a modification was made to FIG. 8. The modifications will be described hereinafter. FIG. 15 is a flow chart when the main control part 4030 received I/O from the host I/F 1300.

The main control part 4030, when it has received an input/output request from the host I/F 1300, recognizes the reference series command, the update change series command and the lock series command (commands such as reserve, region reserve and release in SCSI) in a step 5000, and the process is bifurcated. In the case of the reference series command, the process goes to a step 5005. In the case of the update change series command, the process goes to a step 5010. In the case of the lock series command, the process goes to a step 5070. The steps 5010 and 5005 are the same process. This process investigates whether a process object scope in which reference and update change processes are carried out is locked or not by use of the reserve series command by another superior device. According to this lock state, the main control portion 4030 judges whether the superior device which issued reference and update change requests can process the reference and update change or not as to its requested scope. The details of this judgment process will be described later.

In case of the reference series command, after the process of the step 5005 has been completed, the process goes to judgment result bifurcation of a step 5020. In case of the update change series command, after the process of the step 5010 has been completed, the process goes to judgment result bifurcation of a step 5050. On the occasion of the reference series request, in case a request scope can be referred to in a step 5020, the process goes to a step 5030. In case the reference is impossible, the process goes to a step 5040. In the case of the update change request, if the request scope can be updated and changed in the step 5050, the process goes to a step 5060. In case the update change is impossible, the process goes to the step 5040. The step 5040 notifies, in the case where the reference/update change is impossible, unavailability of the request scope through the host I/F 1300 to a superior device (In the SCSI protocol, Reservation Conflict is returned to the superior device).

The step 5030 carries out the processes of the steps 3005, 3010, 3020, 3040 and 3030. Here, in the bit map table 4010, the block reference request of the bit values 0 and 2 represents a state in which data on the physical disk 1370 is the most recent data, and reference data becomes data which is read in from the physical disk 1370. Reference requests of the block scopes of the bit values 1 and 3 represent a state in which data on the cache memory 1340 is the most recent data, and reference data becomes data which is read in from the cache memory 1340.

The step 5060 is a process of the data consistency holding control part 4020 which will be described later. The step 5070 is a process of the exclusive control part 4000 in the case where a lock series command has been handed over from the host I/F 1300 to the main control part 4030. The exclusive control part 4000, which will be described later, gives back a return value to the main control part 4030. After reception of the return value was completed, the process goes to a step 5080. The step 5050 hands over the return value, which was received from the exclusive control part 4000, to the host I/F 1300. After the return value was transmitted to the host I/F 1300, the process in the case of having received the lock series command is complete.

FIG. 16 is a flow chart showing the process procedures in the case in which the main control part 4030 has received an I/O request from DKCI/F 1320. A step 5100 recognizes the update change series command or the lock series command, and the process is bifurcated. In the case of the update change series command, the process goes to a step 5110. In the case of the lock series command, the process goes to a step 5120. The step 5110 is a process of the data consistency holding control part 4020 which will be described later. The step 5120 is a step employed in the case where the lock series command was handed over from the DKCI/F 1320. The process of the step 5120 is carried out in the exclusive control part 4000, and the main control part 4030 receives its return value from the exclusive control part 4000. After reception of the return value has been completed, the process goes to a step 5130. The step 5130 hands over the return value, which was received from the exclusive control part 4000, to the DKCI/F 1320. After the return value has been transmitted to the DKCI/F 1320, the process is complete.

Figure 17:
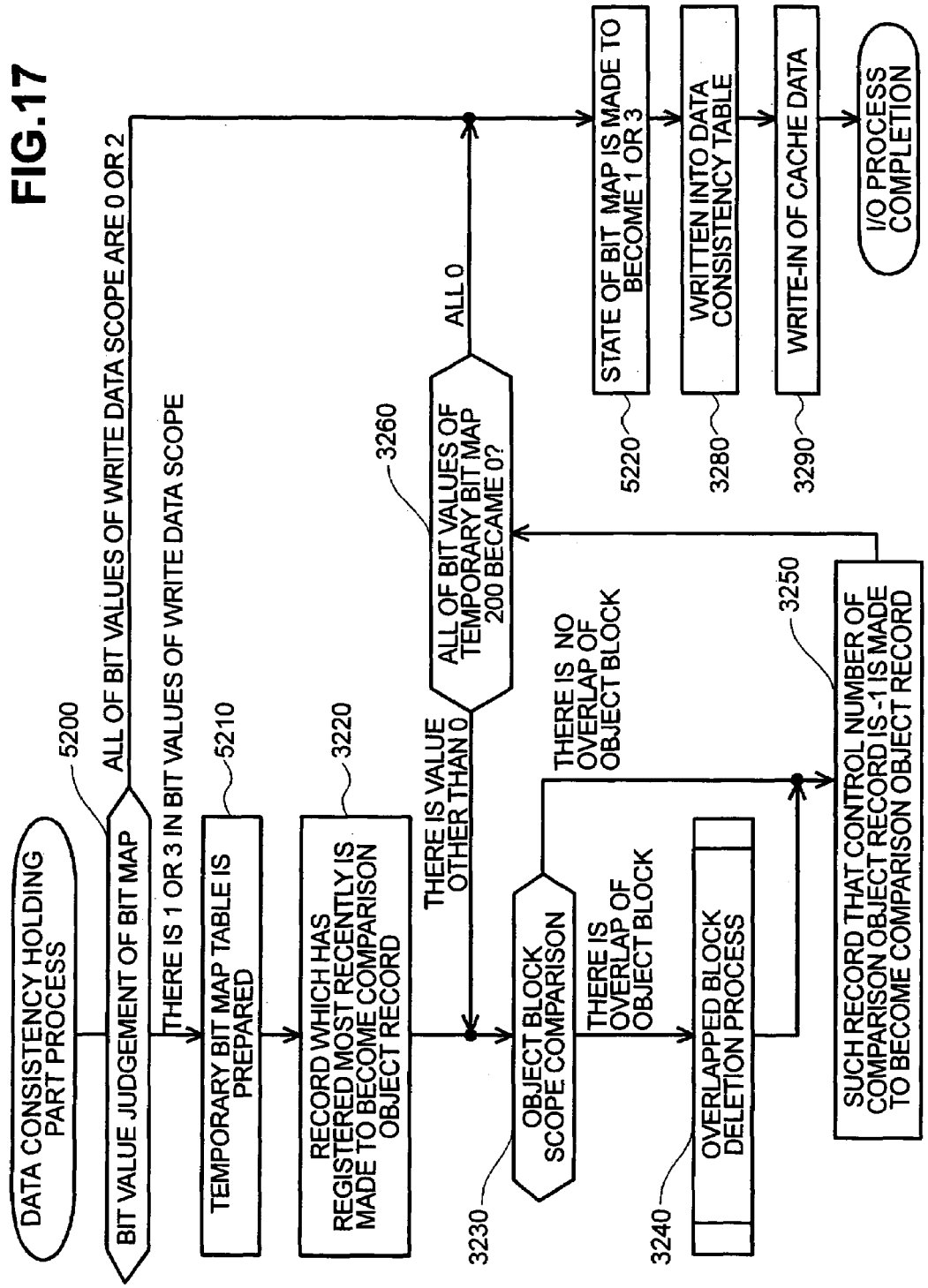
FIG. 17 is a flow chart showing the processing of a write-in request of a data consistency holding control part of the third embodiment.
Figure 18:
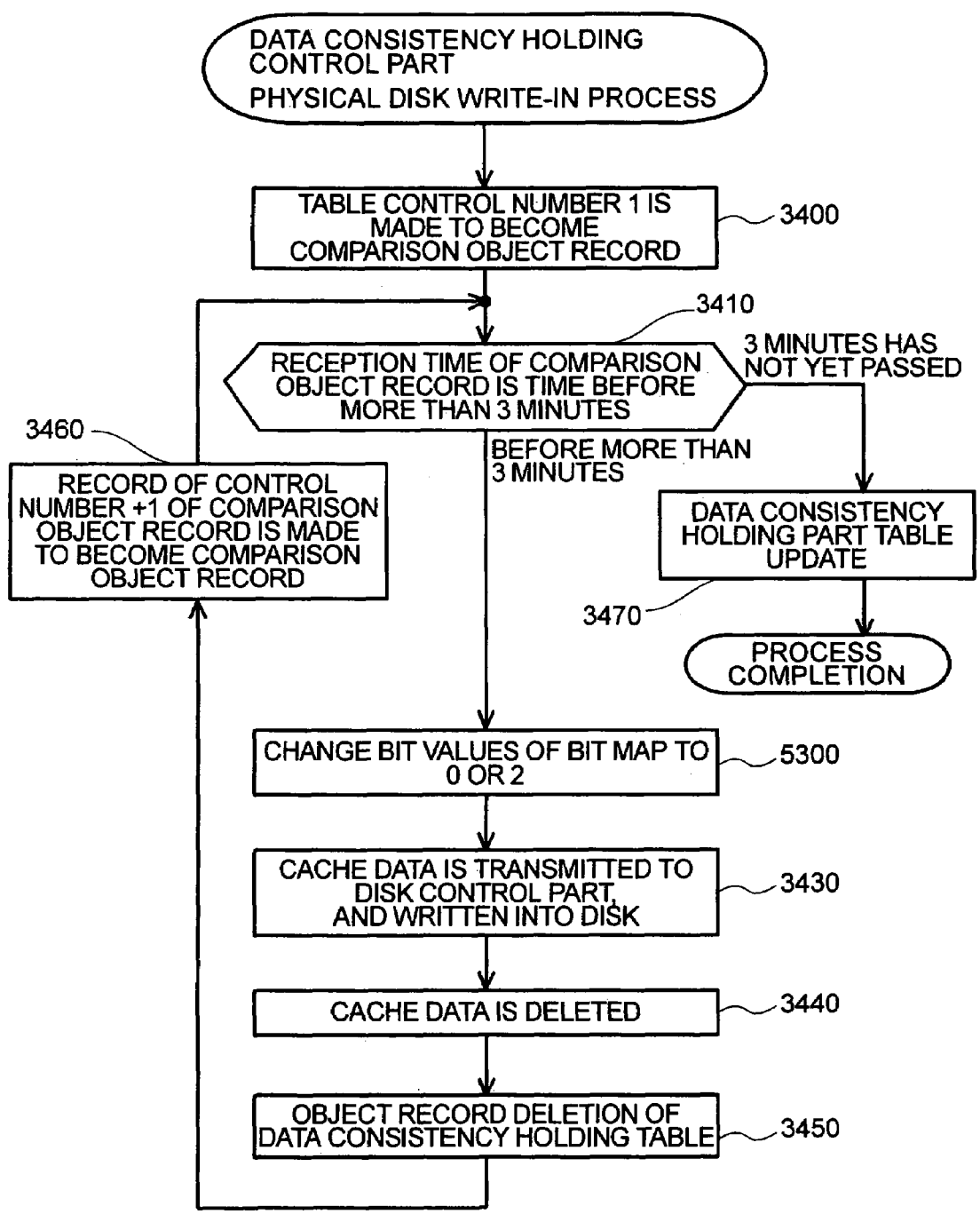
FIG. 18 is a flow chart showing the processing of a write-in request of the data consistency holding control part of the third embodiment.

FIGS. 17 and 18 are flow charts showing the processing of the data consistency holding control part 4020. The main difference from the data consistency holding control part 2040 is a change due to an increase of the states which are possessed by the bit map table 4010. FIG. 17 shows a modification of the flow chart shown in FIG. 9. In FIG. 17, the step 3200 was changed to a step 5200, and the step 3210 was changed to a step 5210, and the step 3270 was changed to a step 5220. The step 5200 compares the write-in scope of the write data with corresponding bit values of the bit map table 4010. As a result of this comparison, when all of the bit values of the scope of the write data are the bit value 0 or 2 (when the most recent data exists in the physical disk 1370), the process goes to a step 5220. As to the scope of the write data, when corresponding bit values of the bit map table 4010 include the bit value 1 or 3 (when the most recent value exists on the cache memory 1340), the process goes to a step 5210.

In the step 5210, the temporary bit map table 200 is prepared to have the same size as the scope of the write data. The temporary bit map table 200 corresponds to a write-in block of the write data. The temporary bit map table 200 substitutes the bit value 1 in a block which represents the bit value 1 or 3, in the bit map table 4010, and substitutes the bit value 0 in a block which represents the bit value 0 or 2. In short, with a block position of the disk in which change data exists on the cache memory 1340 as the bit value 1, it is stored in the temporary bit map table 200.

The step 5220 is a process for changing a bit value of the bit map table 4010. In case the bit value of the bit map table 4010 before the process is 0 or 1, it is changed to 1, and in case the bit value is 2 or 3, it is changed to 3.

FIG. 18 shows a process in which the step 3420 of writing cache data on the cache memory 1340 into the physical disk 1370 (simultaneous write-in process) was changed to a step 5300. The step 5300 is a process for changing bit values of the bit map table 4010. In case a bit value of the bit map table 4010 which is an object to be changed is the bit value 1, it operates to change it to the bit value 0; and, in case of the bit value 3, it operates to change it to the bit value 2. This is a process for changing the bit value of the bit map due to disappearance of the cache data in the cache memory 1340 by the simultaneous write-in process.

Figure 19:
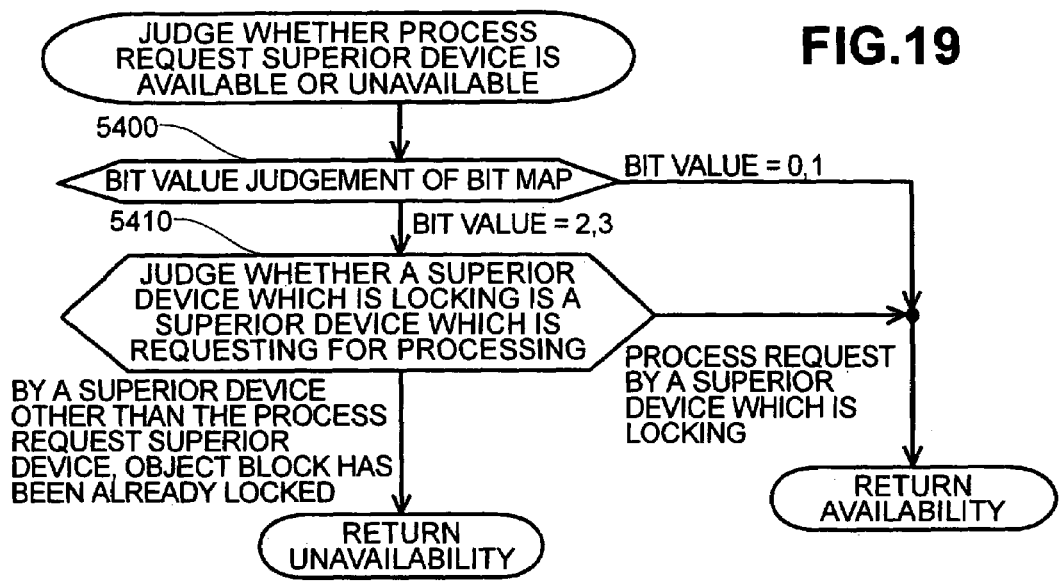
FIG. 19 is a flow chart of a superior device usable/unusable judging process of an exclusive control part of the third embodiment.
Figure 20:
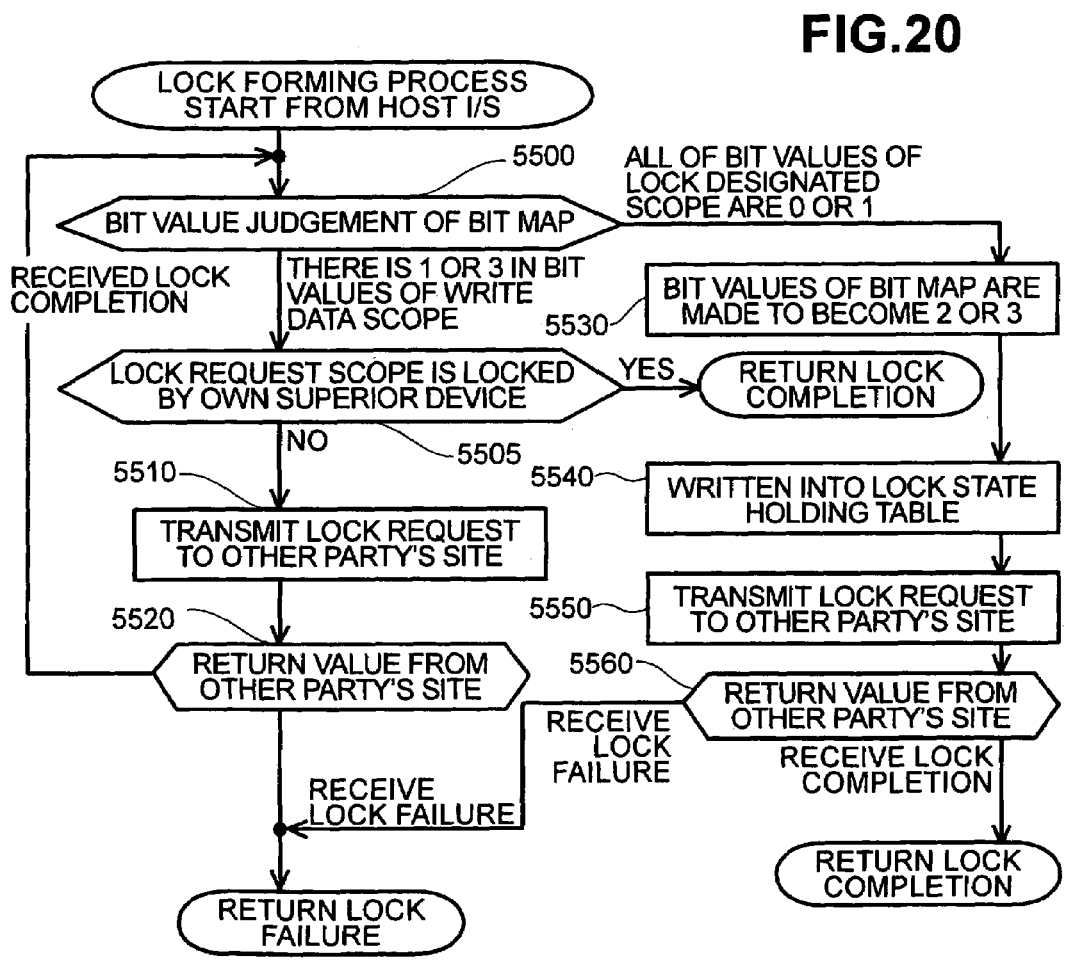
FIG. 20 is a flow chart of a lock forming process in response to a lock forming request which was received from a host I/F of the exclusive control part of the third embodiment.
Figure 21:
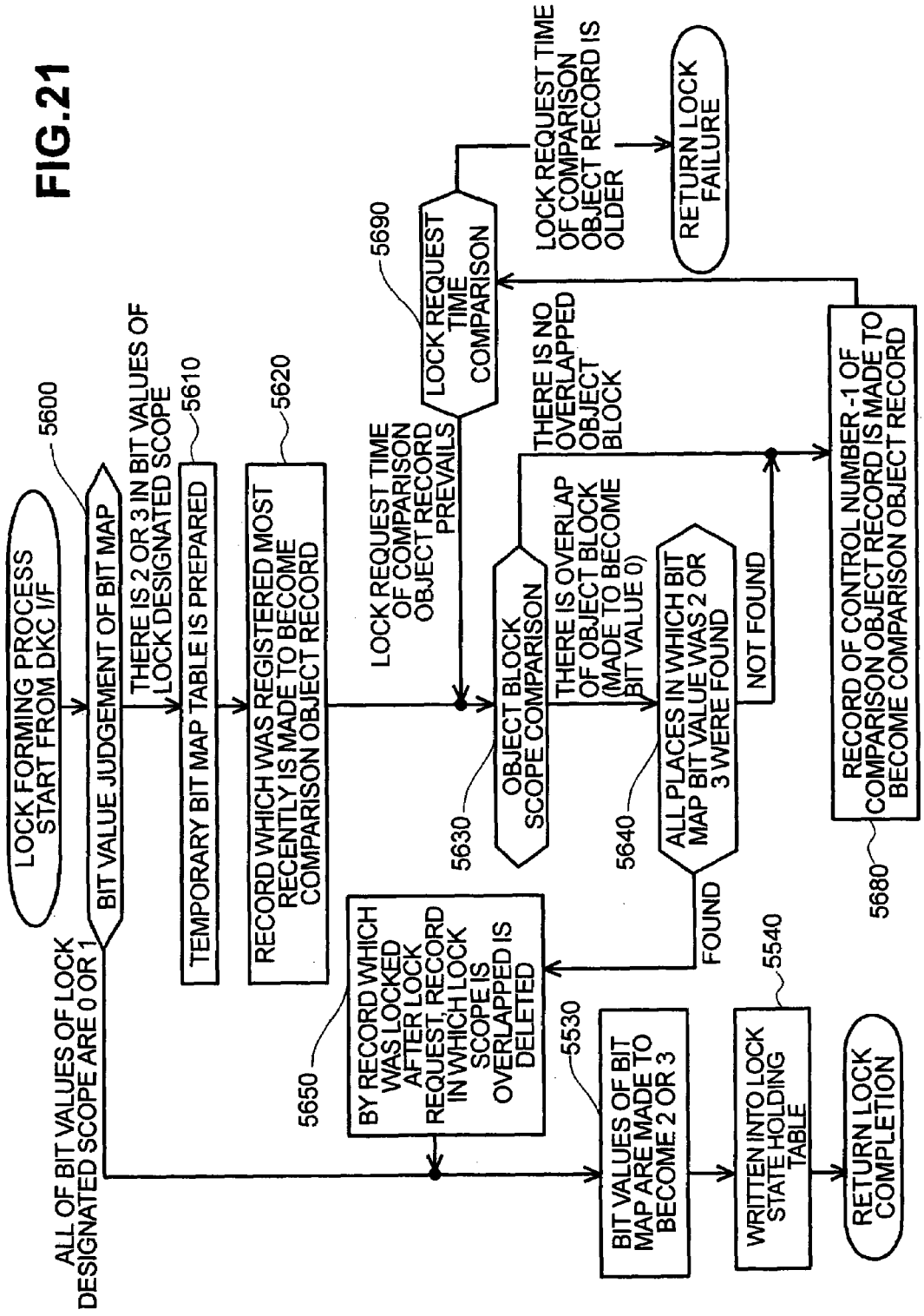
FIG. 21 is a flow chart of a lock forming process in response to a lock forming request which was received from DKCI/F of the exclusive control part of the third embodiment.

FIGS. 19, 20 and 21 are flow charts of the processes relating to the exclusive control part 4000. FIG. 19 shows a process for judging whether the write-in process in the write-in scope is possible, on the occasion that a write-in request of a superior device is received, i.e., whether the write-in scope has already been locked by one other than the superior device which issued the write-in request.

A step 5400 judges whether the request scope is locked or not by the superior device, by referring to the bit map table 4010 which corresponds to a process request scope (scope for which reference, update change are requested). In case all of the request scope are the bit value 0 or 1, the process request scope is not locked by any superior device, and the exclusive control part 400 sets the availability to the return value. In case the bit value 2 or 3 is included in the process request scope, the process goes to a step 5410. In the step 5410, it is judged whether the superior device which locks the process request scope is the superior device which is issuing the process request or not, by referring to the record of the lock state holding table 400. As to this judgment, in the bit map table 4010, which corresponds to the process request scope, all of the records of the lock state holding table 400 of the bit value 2 or 3 are searched, and it is judged whether the superior device identification number 403 with the searched record is the superior device which is requesting the process at this time or not. On the occasion of locking due to the superior device which is requesting the process, the write data at this time can be processed, and the availability is set to the return value. On the occasion of a process request by one other than the superior device which is requesting the process, the unavailability is set to the return value.

FIG. 20 is a flow chart of the processing by the exclusive control part 4000 in the case where the host I/F 1300 has received a lock request in connection with a disk from a superior device. A step 5500 judges whether the lock request scope (block scope of a disk which is requested to be locked) has been locked by another superior device, by referring to bit values of the bit map table 4010. When all of bit values which correspond to the lock request scope are 0 or 1 (a state in which no superior device effects a lock), the process goes to a step 5530. In case where 2 or 3 is included in the bit values which correspond to the lock request scope, it means that the lock request scope has been already locked by a certain superior device. On this occasion, in a step 5505, it is judged whether or not the reserve of a lock designation scope is a reserve state of a superior device which is requesting a lock this time. In the case of a lock request from the superior device which is locking, lock completion is set to the return value.

In the case of a lock state of another superior device, fundamentally, lock failure is set to the return value. However, under a remote copy environment, there may be a case in which a lock deletion process is being executed by the other site of the copy pair, and a lock request was received during a period in which its process result arrives at its own site. Thus, by the process of a step 5510, the lock request is transmitted to the copy destination storage device system. This return value is judged in a step 5520, and in the case where lock failure was returned from a storage device system of the other party's site, lock failure is set to the return value. In the case of having received lock completion from the step 5520, the process goes again to the step 5500, and the lock process is carried out from the beginning.

The steps 5505 and 5520 firstly judge whether there is a state locked by another superior device with reference to the bit map table 4010 in its own host. Next, the return value of the lock request to other site is viewed. Since this process transmits lock failure to a superior device, after the bit map of its own site has been judged, and it was judged that a lock is impossible, it is faster this time for a superior device to issue a lock request again, which is effective. A process for transmitting a lock request to the other site and for waiting for the lock request becomes a process necessary corresponding to the time-lag which relates to propagation in reserve information propagation under the remote copy environment.

Figure 22:
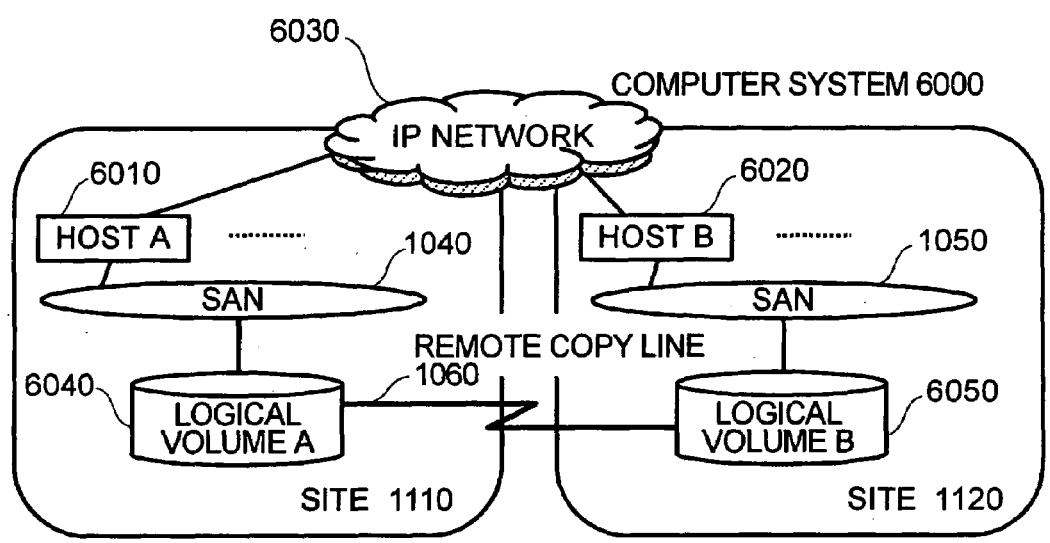
FIG. 22 is a block diagram of a computer system to which the third embodiment is applied.
Figure 23:
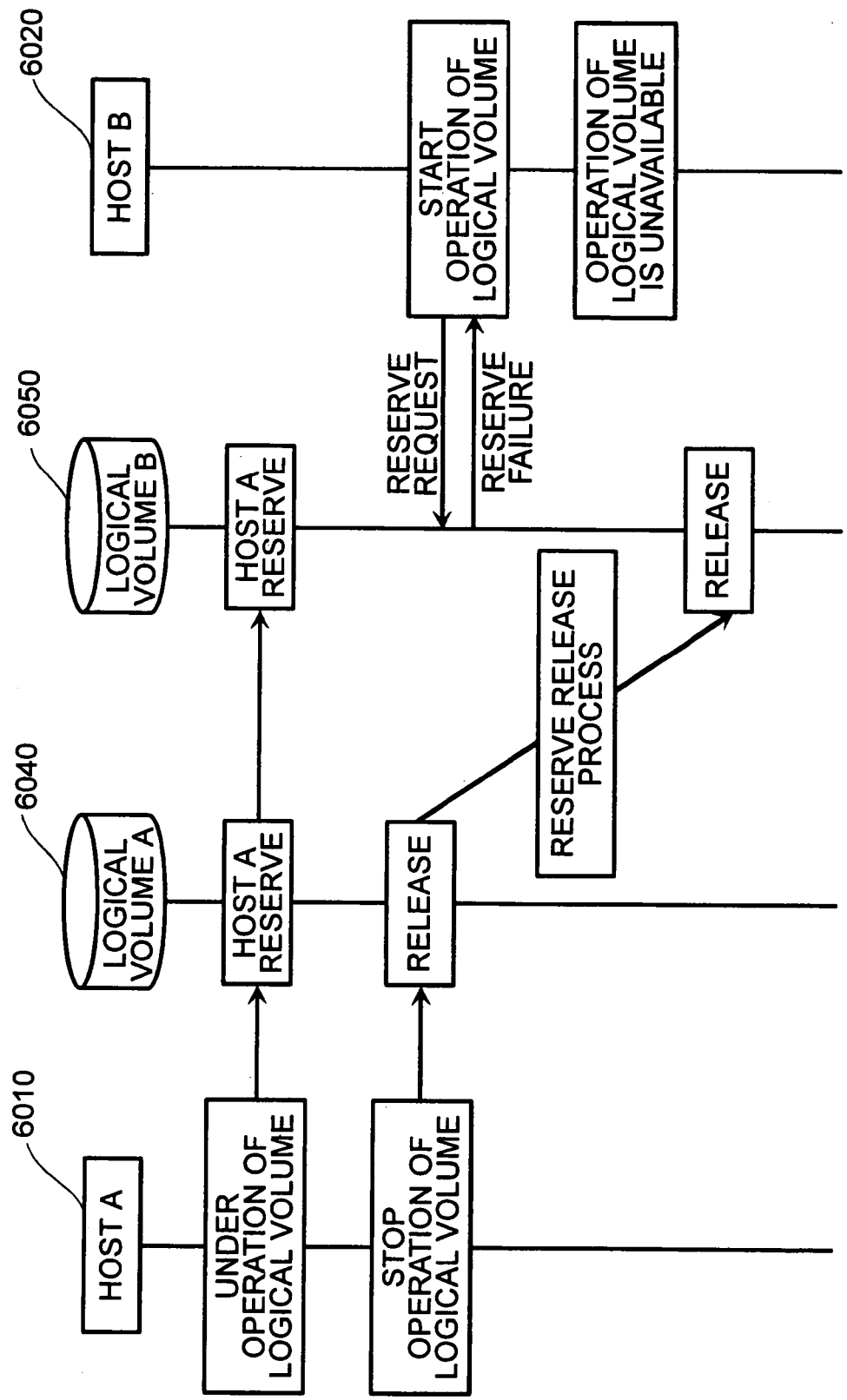
FIG. 23 is a process sequence chart representing one example of the processes of the system of FIG. 22.

Here, more specifically, an environment which is required for the process of the step 5520 will be described by reference to the computer system 6000 of FIGS. 22 and 23. FIG. 22 is a block diagram of this computer system. In this system, a host A 6010 and a host B 6020 of a site 1110 and a site 1120, respectively, establish a cluster environment. It is assumed that this cluster is managing a logical volume as a resource of the cluster. In the site 1110, there is a logical volume A 6040, and in the site 1120, there is a logical volume B 6050. The respective logical volumes are ones in which a copy pair is formed by way of bi-directional remote copy. Both hosts handle these plurality of logical volumes as the same logical volume. The hosts A and B communicate by use of an IP (Internet Protocol) network 6030.

Next, an example of the state transition and processing of FIG. 23 will be described. In this cluster, there may be a case in which exclusive control of a disk is carried out by a reserve command of SCSI. For example, it consists of a cluster server of Microsoft Corporation, and so on. Here, when the host A 6010 of the site 1110 manages the logical volume A 6040 as a resource in case of off-line operation, the host A 6010 reserves the logical volume A 6040. Next, the work of the host A 6010 is to be transferred (fail-over) to the host B 6020, and the logical volume A 6040 which has been used is to be transferred to the logical volume B 6050, which is the remote copy pair. The host A 6010 releases the logical volume A 6040, and the host B 6020 reserves the logical volume B 6050, and the host B 6020 carries out an operation by use of the logical volume B 6060. The hosts A 6010 and B 6020 communicate the fail-over by use of the IP network 6030 and carry out the transfer of the process, smoothly.

On this occasion, when the release of the host A 6010 and the reserve of the host B 6020 are carried out at almost the same time, in case there are no processing of the steps 5510 and 5520, the host B 6020 can not reserve the logical volume B 6050. That is, regardless of the fact that the logical volume A 6040 is released, the logical volume B 6050 is not released, and, therefore, the host B 6020 can not reserve the logical volume B 6050. As indicated above, due to the fact that the released logical volume can not be reserved, there occurs a possibility of affecting the operation of the cluster server. Thus, a process of not returning a result of the reserve request quickly to a reserve request host, but of waiting for a reply of the reserve request to the other party's site, like the steps 5510 and 5520, and of returning it to a host, becomes necessary.

A step 5530 changes the bit values of the bit map table 4010 which corresponds to the lock object region to 2 or 3. More specifically, in case the bit values of a change object bit map of the bit map table 4010 are 0, a process for changing bits to 2 is carried out, and in case the bit values are 1, a process for changing bits to 3 is carried out. After the bit values have been changed, the process goes to a step 5540. The step 5540 registers records of the lock start time 402, the superior device identification number 403, the lock object start address 404 and the lock object size 405 of the lock request at such a record position that the control number 401 of the lock state holding table 400 is −1. The control number 401 is set to such an integer that +1 is added to the control number 401 of a record one above. Next, the exclusive control part 4000 applies −1 to the control number 401 of the vacant record one below the registered record. After the write-in process of this record has been completed, the process goes to a step 5550. The step 5550 transmits the lock request to the other party's site storage device system. Here, although a transmission method is not particularly described, a vendor-specific command in which a write command of the SCSI was expanded may be used.

In the processes of the steps 5510 and 5550, the record items of the lock state holding table 400 and the return value at the time of the lock request are handed over through the remote copy line 1060 to the DKCI/F 1320. The step 5550 judges the return value from the other party's site. In the case where lock completion is the return value, the lock completion is set to the return value. In the case where lock failure is the return value, the lock failure is set to the return value.

As a result of the processes of the steps 5550 and 5560, a case in which lock failure is returned from the other party's site will be described. This case is such that the storage device system 1070 and the storage device system 1080 receive the lock request from a superior device at almost the same time. In this case, when the lock request of the site 1110 has failed, a lock of the site 1120 becomes successful. Then, the storage device system 1070 has to cancel the processes which were carried out in the steps 5530 and 5540, but this cancel process is, as will be described later, carried out by a lock forming process of the storage device system 1080 which was successfully locked to the storage device system 1070 (see, the process of a step 5650 of FIG. 21)

FIG. 21 shows process procedures of the exclusive control part 4000 in the case where the DKCI/F 1320 has received the lock request from other site. A step 5600 judges bit values of a bit map which corresponds to the lock request scope in the bit map table 4010. In case all of the lock request scope are the bit value 0 or 1, the process goes to the step 5530. In case the bit value 2 or 3 is included in the lock request scope, the process goes to a step 5610. The step 5610 prepares the temporary bit map table 200 with a size corresponding to the lock request region, and, focusing on corresponding bit values 2, 3 of the bit map table 4010, bit map information is written into the temporary bit map table 200.

At the time of write-in of the bit map information, in the case where the bit value 2, 3 appears in the bit map table 4010, the bit value 1 is written in the bit map table 4010; and, in the case where the bit value 0, 1 appears in the bit map table 4010, the bit value 0 is written in the temporary bit map table 200. In this way, the temporary bit map table 200 pays attention only to whether a corresponding block was locked or not, and a bit which corresponds to a block which was overlapped and locked becomes a bit value having the bit value 1, and a bit which corresponds to a block which is not locked becomes a bit value having the bit value 0.

After the temporary bit map table 200 was prepared, the process goes to a step 5620. The step 5620 substitutes the control number 401 of a record which was written most recently (such a record one above that the control number 401 is −1) of the lock state holding table 400 in the variable current. After the substitution, the process goes to a step 5630.

The step 5630 judges whether or not there is a portion which is overlapped and locked in a scope of the bit value 1 of the temporary bit map table 200 and a lock scope of the current record. In case it was overlapped, the bit value of the overlapped portion of the temporary bit map table 200 is made to become 0, and the process goes to a step 5640. In case of no overlap, the process goes to a step 5680. In the step 5680, the variable current is made to become −1, and the process goes to a step 5690. The step 5690 compares the lock request time at this time with the lock start time 402 of the current record. In case the lock start time 402 of the current record is older (time is earlier), since there is a block scope which was locked at an older time than the lock request time at this time in a corresponding block scope, lock failure is set to the return value, and in case the lock start time 402 of the current record is newer (time is later), the process goes to the step 5630. A process in case of comparing completely the same time is similar to the one described in case of the step 3300.

In the step 5640, it is judged whether all of the bit values of the temporary bit map table 200 become 0. In the case where all of the bit values become 0, it means that only a lock request, which is newer than that at the time of the lock request time of this time, comes in the corresponding block scope, and the process goes to a step 5650. On the occasion that 1 is included in the bit values, a process goes to a step 5680.

As to the record which was locked later than the lock request time and overlapped with the lock request scope, the step 5650 deletes the record from the lock state holding table 400. After the deletion, records of the lock state holding table 400 are arranged so as to eliminate a vacant record from the top of the records of the lock state holding table 400, and control-numbers are assigned again. As to bit values which represent the record scope to be deleted in the bit map table 4010, in case they were the bit value 3, they are changed to the bit value 1, and in case that they were the bit value 2, they are changed to the bit value 0. Next, the steps 5530 and 5540 are carried out in sequence, and lock completion is set to the return value.

Figure 24:
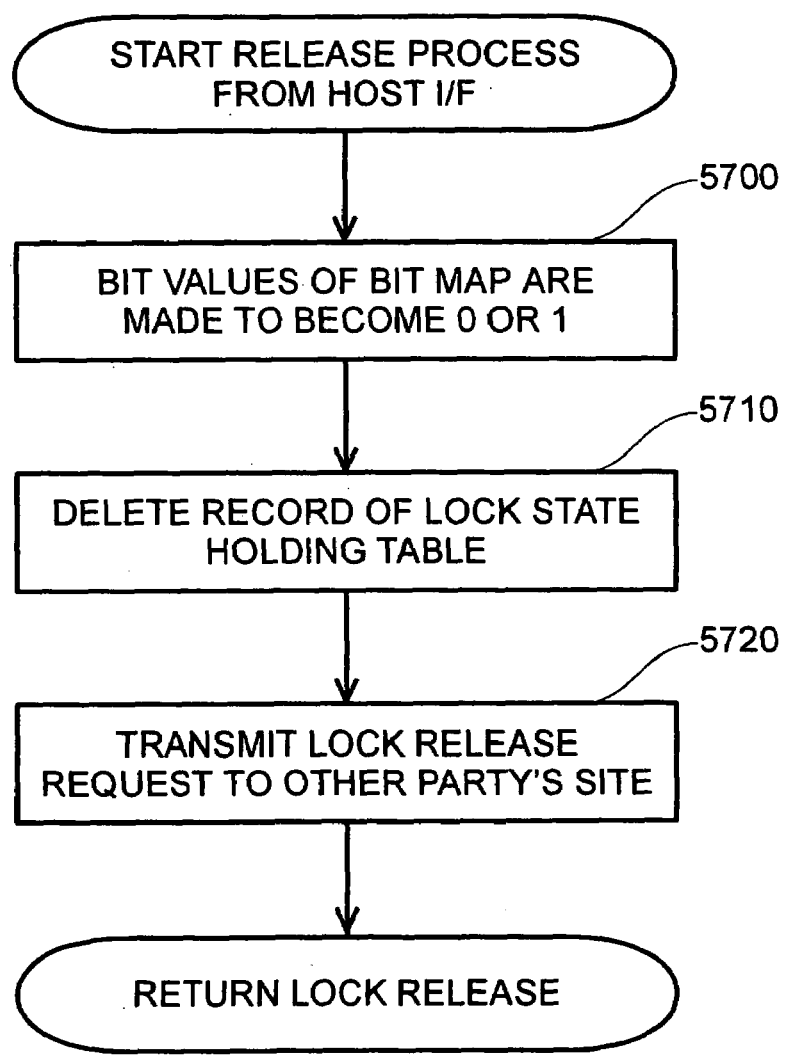
FIG. 24 is a flow chart of a lock release process in response to a lock release request which was received from a host I/F of the exclusive control part of the third embodiment.
Figure 25:
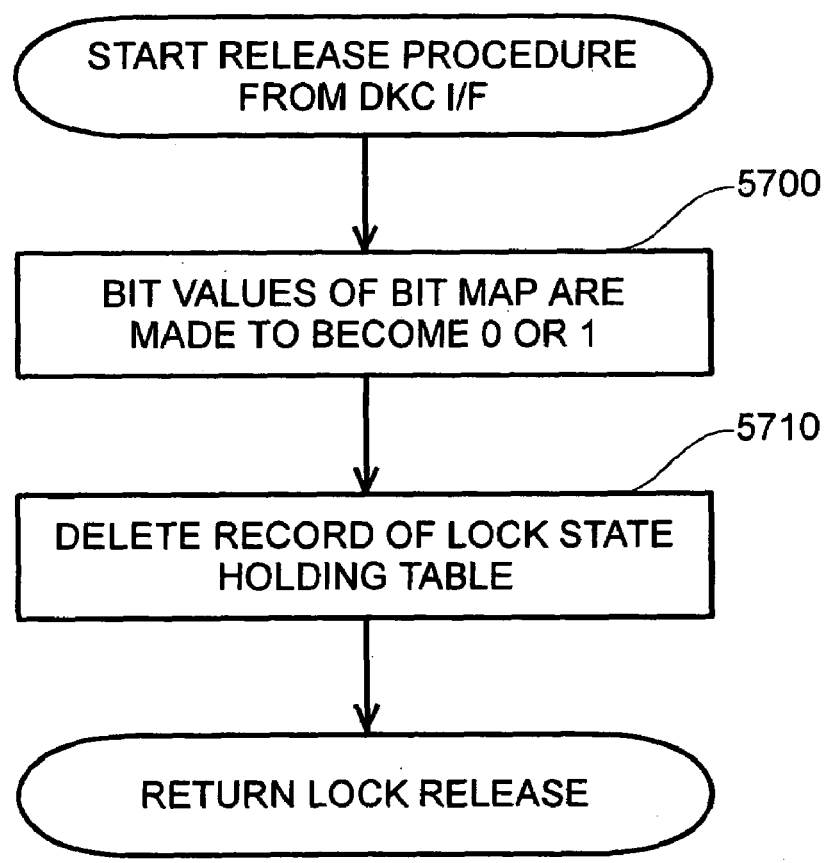
FIG. 25 is a flow chart of a lock release process in response to a lock release request which was received from DKCI/F of the exclusive control part of the third embodiment.

FIGS. 24 and 25 shows processes in the case where the host I/F 1300 and the DKCI/F 1320 have received a lock release request (release command etc. of SCSI). FIG. 24 shows a process in the case where the host I/F 1300 received the lock release request, and FIG. 25 shows a process in the case where the DKCI/F 1320 received the lock release request from another site.

As to bit values of the bit map table 4010 which correspond to a lock release request scope, the step 5700 changes them to 0 when the bit values before processing are 2, and changes them to 1 when the bit values are 3. After the change, the process goes to a step 5710. The step 5710 deletes a record of the lock state holding table 400 which was lock-released. After the deletion, a record which was written one below the record which was lock-released is shifted up to one above, and after it was shifted, the control number 401 of the shifted record is assigned again. As to the control number 401, a control number of the shifted record may be −1. A step 5720 is a process for transmitting the lock release request to DKCI/F 1320 of each storage device system of the copy pair. In each case of FIGS. 24 and 25, after the lock release process has been completed, lock release is set to the return value.

The lock release process of FIGS. 24 and 25 does not separate various commands such as release, reset and so on of SCSI commands. In this embodiment, operation is such that, on the occasion that the lock release came from all of the superior devices, as to the lock release request scope, the lock is released. In the processes of FIGS. 24 and 25, if an identification judgment process etc. of a superior device is entered, it can be further adapted to a remote copy pair environment in which lock release is carried out strictly in accordance with the SCSI protocol.

(4) FOURTH EMBODIMENT

The embodiment 3 accomplishes propagation of reserve information in the case where the bi-directional remote copy of the embodiment 2 is used. The embodiment 4 shows a method of realizing propagation of the reserve information on the occasion of having used the bi-directional remote copy of the embodiment 1.

In the bi-directional remote copy of the embodiment 1, the write-in content is handed over to the DKCI/F 1320. Here, completion of the write-in process of the copy destination storage device system is not waited for. In this situation, there is a possibility that write-in is carried out during a period of the reserve process. With regard to the write-in content during a period of the reserve process, there is a necessity of choosing to handle a content which was written after the reserve request time as the write-in content without any change, or to delete it as no existence of the write-in content. This process is to be entered before lock completion is set to the return value in FIGS. 20 and 21.

Here, a process for deleting the write-in content and for establishing such a situation that the write-in was not carried out will be described. Before lock completion is set to the return value, a search is made to determine whether or not there is write data which was written into the lock object scope of the data consistency table after the lock start time, and when the write-in data exists, a situation is established such that this write-in data was not written, and the record in the data consistency holding table 100 and the cache data on the cache memory 1340 were deleted. By this change, the propagation of reserve information on the occasion of having used the bi-directional remote copy of the embodiment 1 can be realized.

(5) FIFTH EMBODIMENT

The fifth embodiment is a modification of the third embodiment, in which the propagation of reserve information is achieved by another means. In the fifth embodiment, the exclusive control part 400 in the storage device system does not have the lock state holding table 400, and it manages the lock state by use of the protocol of the SCSI, by transmitting the reserve series command directly to the physical disk 1370. At this time, reserve is carried out to the storage device system, which is the other party of the copy pair, through the remote copy line 1060, and the physical disk 1370 in the copy destination also carries out the reserve process by use of the SCSI ID of a superior device. In this reserve process, the disk control part 1350 locks the physical disk 1370 as a reserve from a superior device which requested for locking, by use of a third party reserve. On the occasion of requests, such as a reference, update change etc. from a superior device, firstly by use of the physical disk 1370, it is judged whether there is an available situation.

Since this embodiment used the SCSI protocol as it is, it is possible to precisely carry out the propagation of reserve information, such as a reserve attribute etc. Here, in the reserve state, the disk is managed directly by a SCSI command, but data is managed by the data consistency holding control part 4020. Thus, there occurs such a situation that the physical disk 1370 has a precise reserve state, but it does not have the most recent data.

According to this invention, when the copy pair is configured between a plurality of storage device systems, volumes which configure the copy pair can carry out copying in bi-directions. Each superior device can freely write in any volume which forms the copy pair. Also, it becomes possible to propagate the reserve state between the storage device systems under the bi-directional copying.

What is claimed is:

1. A storage system, for use in a computer system having a plurality of host devices and a plurality of said storage systems, for receiving write-in data from at least one of the host devices, said storage system comprising:
   a physical storage device having a logical volume for storing data,
   wherein said storage system is controlled so that identical data is saved across a plurality of storage systems;
   a device for saving a time of reception on which write-in data was received from a host device in a data consistency holding table;
   wherein said data consistency holding table includes a plurality of entries each indicating a corresponding relation between a reception time of write-in data, an identifier of a host which sent the write-in data to said storage system, an address at which the write-in data is to be stored, an identifier of a storage system in which the write-in data is stored and an address in a temporary storage device within which the write-in data is temporarily stored;
   a communication interface device for conducting bi-directional transmission of write-in data including transmitting write-in data addressed to the logical volume and a corresponding reception time to another storage system and receiving write-in data addressed to the logical volume and the corresponding reception time from the another storage system; and
   a data consistency holding control device for effecting control, based on said data consistency holding table, to write write-in data which was received from the host device and write-in data which was received through the communication interface device into the physical storage device after such write-in data has been made to wait in the temporary storage device for more than a predetermined time as measured from the reception time corresponding to the write-in data to the logical volume, so that, when write-in data which was received from the host device and write-in data which was received through the communication interface device are written in an overlapped manner into the same storage location of the physical storage device, they are written in an order as indicated by their respective reception times.

2. The storage system as set forth claim 1, further comprising:
   a device for searching write-in data to determine for which data said more than said predetermined time has passed as measured from the reception time,
   wherein said entries of said data consistency holding table are arranged according to said reception times corresponding to each write-in data which is waiting in the temporary storage device in an order from an older one.

3. The storage system as set forth in claim 1, further comprising:
   a bit map table for selling a bit value to indicate whether or not each block of the write-in data exists in the temporary storage device; and
   a device for judging whether or not new write-in data is written in an overlapped manner into the same storage location as the other write-in data with reference to the bit map table.

4. The storage system as set forth in claim 1, further comprising:
   a device for receiving a request for locking a partial region of the logical volume from the superior device and for locking the partial region;
   a device for transmitting the locking request which was received through the communication interlace device to the other storage device system;
   a device for receiving the locking request through the communication interlace device from the other storage device system and for locking a designated partial region; and
   a device for rejecting a request for write-in of data from the superior device and the other storage device system to the partial region, except for a case in which it is a request from the superior device in which the partial region was locked.

5. A storage system for use in a computer system having a plurality of host devices and a plurality of said storage systems for receiving write-in data from at least one of the host devices, comprising:
   a physical storage device, having a logical volume for storing data,
   wherein said storage system is controlled so that identical data is saved across a plurality of storage systems;
   a device for saving a time of reception on which write-in data was received from a host device in a data consistency holding table;
   wherein said data consistency holding table includes a plurality of entries each indicating a corresponding relation between a reception time of write-in data, an identifier of a host which sent the write-in data to said storage system, an address at which the write-in data is to be stored, an identifier of data storage system in which the write-in data is stored and an address in a temporary storage device within which the write-in data is temporarily stored;
   a communication interface device for conducting bi-directional transmission of write-in data including transmitting write-in data addressed to the logical volume and a corresponding reception time to another storage device system and receiving write-in data addressed to the logical volume and corresponding reception time from the storage system;
   wherein the reception times in said data consistency holding table corresponding to each of write-in data from the host device and write-in data from the other storage system are arranged in an order from an older one to a newest one; and
   a data consistency holding control device for effecting control, based on said data consistency holding table to write write-in data to the logical volume for which more than a predetermined time has passed as measured from the reception time into the physical storage device in the order of the older reception time.

6. The storage system as set forth in claim 5, further comprising:
   a device for receiving a request for locking a partial region of the logical volume from the superior device and for locking the partial region;
   a device for transmitting the locking request which was received through the communication interface device to the other storage device system;

a device for receiving the locking request through the communication interface device from the other storage device system and for locking a designated partial region; and a device for rejecting a request for write-in of data from the superior device and the other storage device system to the partial region, except for a case in which it is a request from the superior device in which the partial region was locked.

* * * * *